United States Patent
Kish et al.

(10) Patent No.: US 10,946,776 B2
(45) Date of Patent: Mar. 16, 2021

(54) ADJUSTABLE SEAT ASSEMBLY

(71) Applicant: Ford Global Technologies, LLC, Dearborn, MI (US)

(72) Inventors: Joseph Michael Kish, Canton, MI (US); Jeffrey Gabalski, West Bloomfield, MI (US); Johnathan Andrew Line, Northville, MI (US); Joshua Gauthier, South Lyon, MI (US); Marcos Silva Kondrad, Macomb Township, MI (US); Spencer Robert Hoernke, Dundas (CA)

(73) Assignee: Ford Global Technologies, LLC, Dearborn, MI (US)

( * ) Notice: Subject to any disclaimer, the term of this patent is extended or adjusted under 35 U.S.C. 154(b) by 96 days.

(21) Appl. No.: 16/452,689

(22) Filed: Jun. 26, 2019

(65) Prior Publication Data

US 2020/0406794 A1    Dec. 31, 2020

(51) Int. Cl.
| | |
|---|---|
| *B60N 2/30* | (2006.01) |
| *B60N 2/02* | (2006.01) |
| *B60N 2/14* | (2006.01) |
| *B60N 2/06* | (2006.01) |

(52) U.S. Cl.
CPC ......... *B60N 2/3047* (2013.01); *B60N 2/0232* (2013.01); *B60N 2/06* (2013.01); *B60N 2/143* (2013.01); *B60N 2/3045* (2013.01)

(58) Field of Classification Search
CPC .. B60N 2/3045; B60N 2/3047; B60N 2/3061; B60N 2/3038; B60N 2/305; B60N 2/30; B60N 2/143; B60N 2/0232; B60N 2/06; B60N 2002/022

USPC .......................................... 297/335, 339, 334
See application file for complete search history.

(56) References Cited

U.S. PATENT DOCUMENTS

| | | | |
|---|---|---|---|
| 3,594,037 A * | 7/1971 | Sherman | A47C 7/56 297/14 |
| 4,580,832 A * | 4/1986 | Maruyama | A47C 9/06 297/14 |
| 5,000,505 A | 3/1991 | Kawashita et al. | |
| 5,320,411 A | 6/1994 | Sera | |
| 5,564,780 A * | 10/1996 | Presser | B60N 2/2878 297/238 |
| 5,951,106 A | 9/1999 | Hirama et al. | |
| 6,142,552 A | 11/2000 | Husted et al. | |
| 6,666,514 B2 | 12/2003 | Muraishi et al. | |
| 7,108,325 B2 | 9/2006 | Williamson et al. | |
| 7,357,451 B2 | 4/2008 | Bendure et al. | |

(Continued)

*Primary Examiner* — Milton Nelson, Jr.
(74) *Attorney, Agent, or Firm* — David Coppiellie; Price Heneveld LLP

(57) ABSTRACT

A seat assembly includes a base frame and first and second guide brackets coupled to opposed sides of the base frame. The first and second guide brackets each include slots disposed therethrough. First and second support brackets are slideably mounted to the slots of the first and second guide brackets, respectively. A seat portion includes a seat frame that is pivotally coupled to the first and second support brackets at opposed first and second ends of the seat frame. The seat frame is configured to pivot with respect to the first and second support brackets between use and upright non-use positions. The base frame is rotatably supported on a swivel mechanism for rotation of the seat assembly between forward-facing and rearward-facing configurations.

16 Claims, 16 Drawing Sheets

(56) References Cited

U.S. PATENT DOCUMENTS

| | | |
|---|---|---|
| 7,559,594 B2 | 7/2009 | McMillen |
| 7,950,740 B2 | 5/2011 | Bunea et al. |
| 8,113,137 B2 * | 2/2012 | Thompson .............. B63B 29/04 |
| | | 114/363 |
| 2002/0125753 A1 * | 9/2002 | Kammerer ........... B60N 2/3031 |
| | | 297/331 |
| 2009/0195037 A1 | 8/2009 | Plavetich et al. |
| 2014/0001809 A1 * | 1/2014 | Line .................... B60N 2/2356 |
| | | 297/378.1 |

* cited by examiner

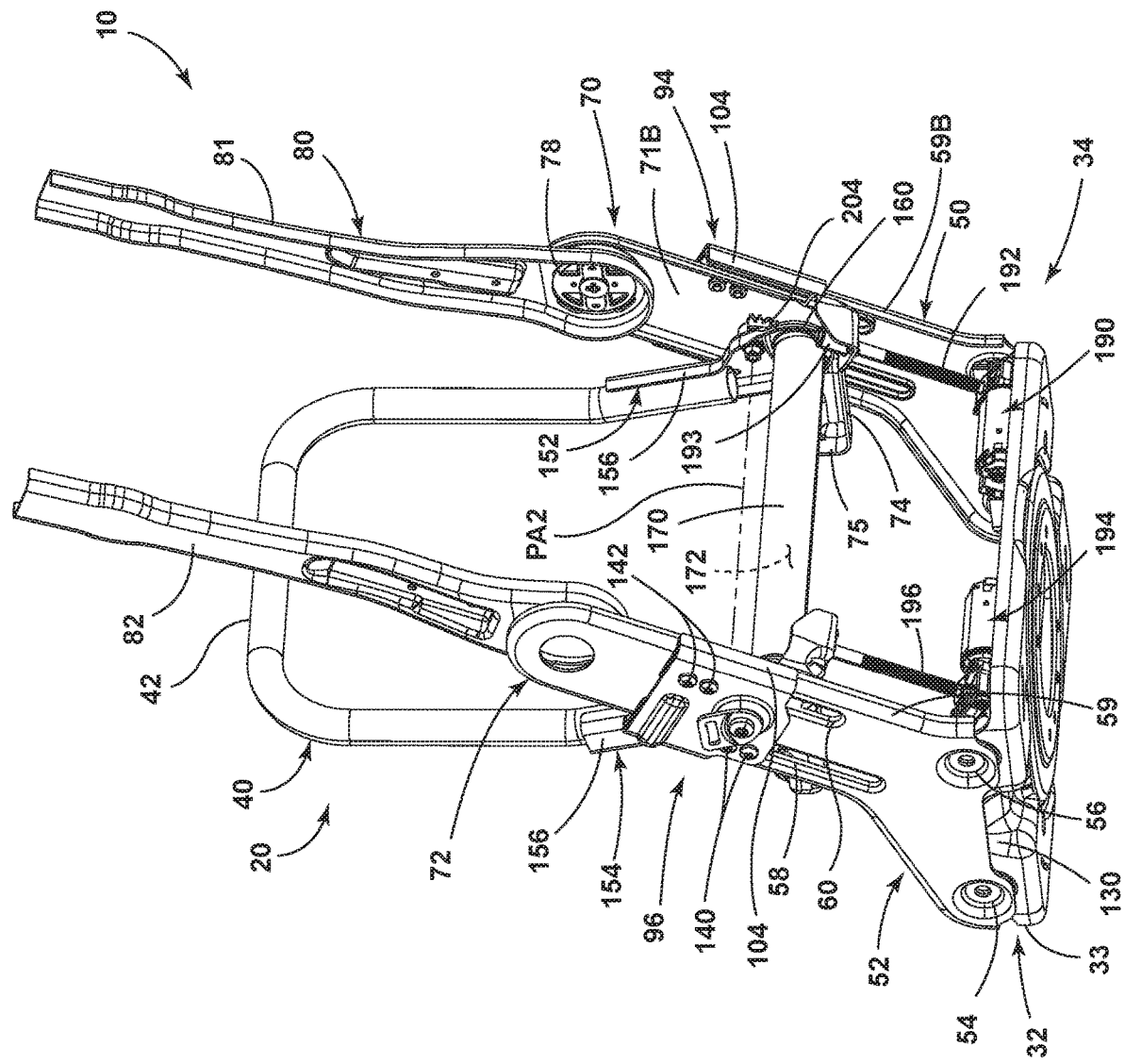

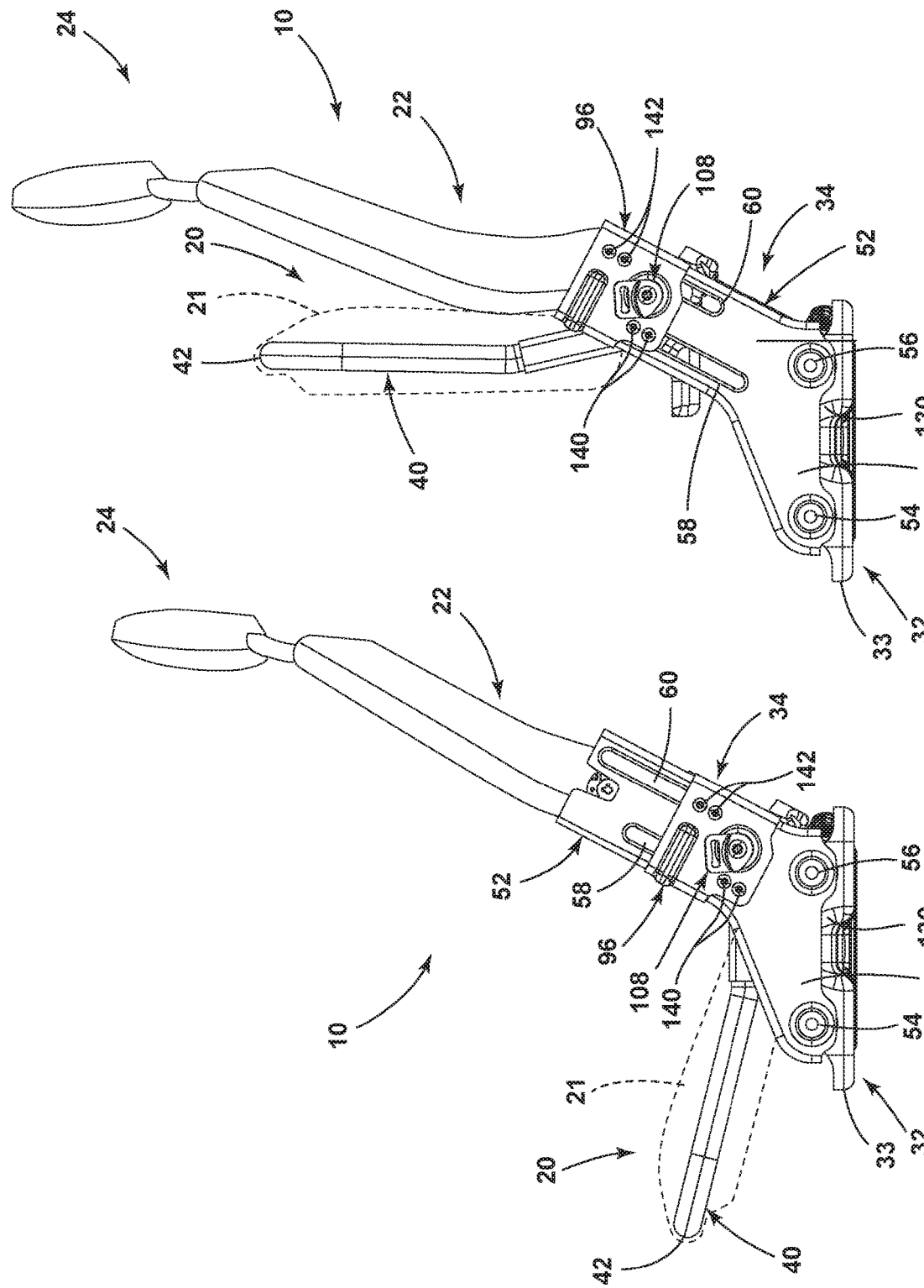

US 10,946,776 B2

ADJUSTABLE SEAT ASSEMBLY

FIELD OF THE INVENTION

The present invention generally relates to a vehicle seat, and more particularly, to a vehicle seat configured to rotate between forward-facing and rearward-facing configurations within a vehicle interior.

BACKGROUND OF THE INVENTION

A vehicle seat is desired that accommodates rotation within a vehicle interior.

SUMMARY OF THE INVENTION

According to one aspect of the present invention, a seat assembly includes a base frame with first and second guide brackets coupled to opposed sides of the base frame. The first and second guide brackets each include slots disposed therethrough. First and second support brackets are slideably mounted to the slots of the first and second guide brackets. A seat portion includes a seat frame that is pivotally coupled to the first and second support brackets at opposed first and second ends of the seat frame. The seat frame is configured to pivot with respect to the first and second support brackets between use and upright non-use positions.

According to another aspect of the present invention, a seat assembly includes a base frame. A guide bracket is coupled to the base frame and includes inner and outer surfaces. A support bracket is slideably coupled to the inner surface of the guide bracket between raised and lowered positions. A retainer bracket is slideably coupled to the outer surface of the guide bracket. The retainer bracket is further coupled to the support bracket for movement therewith. A seat frame is pivotally coupled to the support bracket between use and upright non-use positions.

According to yet another aspect of the present invention, a seat assembly includes a support bracket. A retainer bracket is operably coupled to the support bracket. A guide bracket is slideably disposed between the support bracket and the retainer bracket. The guide bracket includes at least one slot disposed therethrough. At least one guide member is slideably received in the at least one slot of the guide bracket. The at least one guide member is coupled to the support bracket on a first side of the at least one guide member. The at least one guide member is coupled to the retainer bracket on a second side of the at least one guide member. A seat frame is pivotally coupled to the support bracket.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4C is a rear perspective view of the seat portion and lift mechanism of FIG. 4A with the seat portion in an upright non-use position;

FIG. 6A is a side elevational view of a seat assembly shown in a forward-facing configuration with a seat portion shown in a deployed position;

FIG. 6B is a side elevational view of the seat assembly of FIG. 6A with the seat portion shown in a stowed position;

DETAILED DESCRIPTION OF THE PREFERRED EMBODIMENTS

Figure 2A:
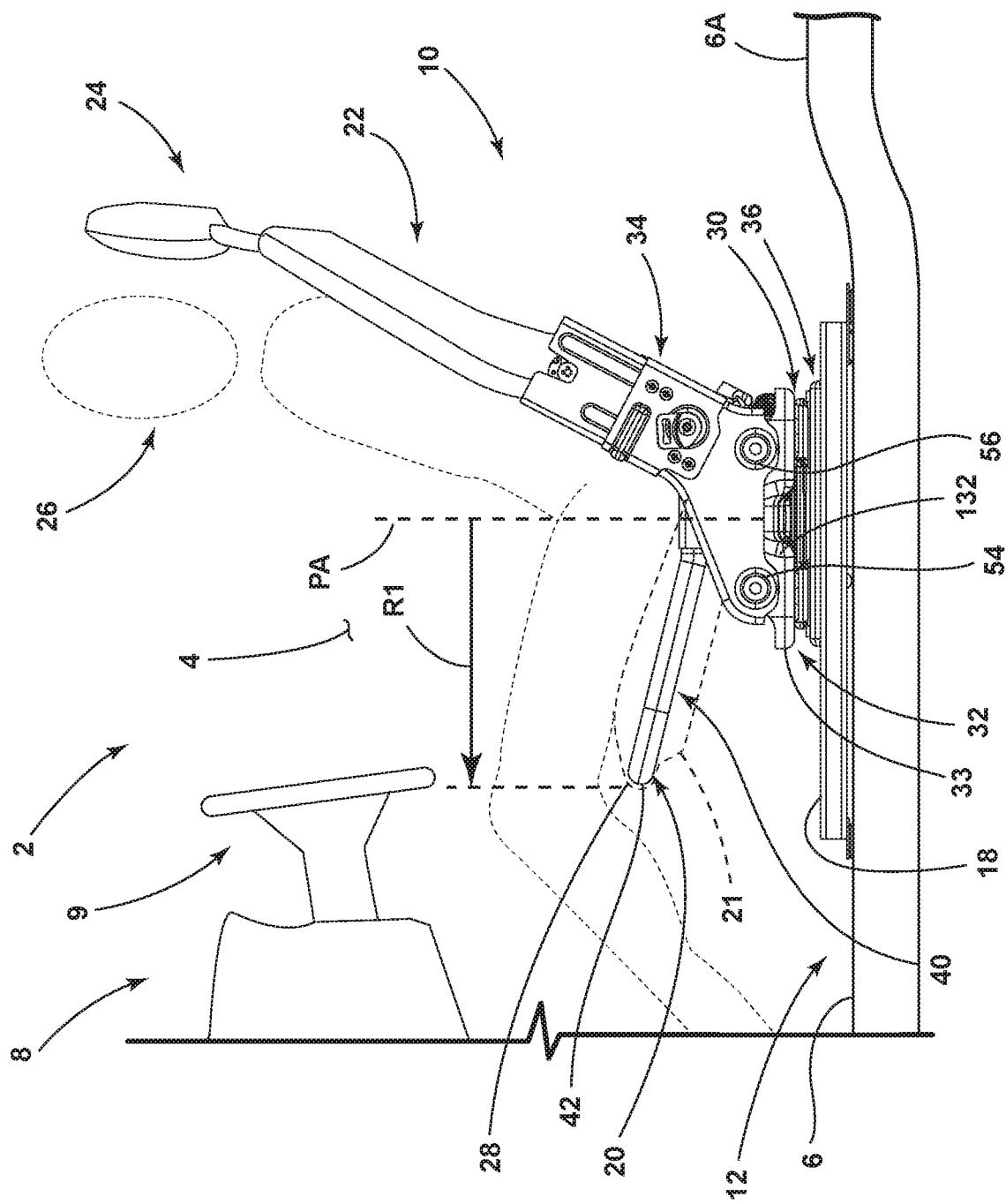
FIG. 2A is a side elevational view of a seat assembly shown in a forward-facing configuration with a seat occupant positioned therein.

For purposes of description herein, the terms "upper," "lower," "right," "left," "rear," "front," "vertical," "horizontal," and derivatives thereof shall relate to the seat assembly as oriented in FIG. 2A. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
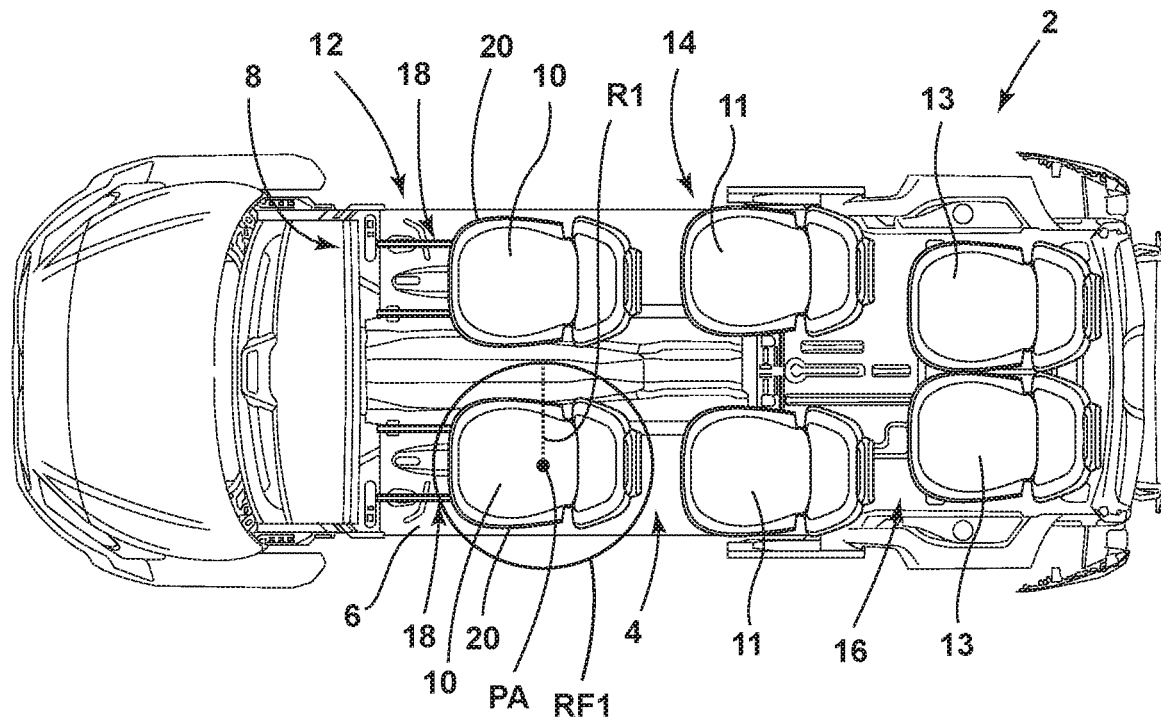
FIG. 1A is a top plan view of a vehicle showing a number of seat assemblies positioned within an interior thereof, wherein a front seat assembly includes a seat portion shown in a deployed position with a rotational footprint indicated.

Referring now to FIG. 1A, a vehicle 2 is shown having a vehicle interior 4. The vehicle interior 4 includes a floorboard 6 and an instrument panel 8. Within the vehicle 2, a plurality of seat assemblies 10, 11 and 13 are shown. The seat assemblies identified with the reference numeral 10 are shown disposed in a front portion 12 of the vehicle interior 4. The seat assemblies identified with reference numeral 11 are shown disposed in an intermediate portion 14 of the vehicle interior 4. The seat assemblies identified with reference numeral 13 are shown disposed in a rear portion 16 of the vehicle interior 4. The seat assemblies 10 shown disposed in the front portion 12 of the vehicle interior 4 are supported on the floorboard 6 by track assemblies 18. The track assemblies 18 are contemplated to provide an extended range of fore and aft movement of the seat assemblies 10 for accommodating forward-facing and rearward-facing configurations. As shown in FIG. 1A, the seat assemblies 10, 11 and 13 of the vehicle 2 are all shown disposed in a forward-facing configuration. For the purposes of this disclosure, the features of the seat assemblies 10, 11 and 13 will be described with reference to seat assemblies 10, however, it is contemplated that the flexibility and pivoting features of the seat assemblies described herein may be featured on other seat assemblies disposed in the intermediate portion 14 or the rear portion 16 of the vehicle interior 4.

With further reference to FIG. 1A, the seat assembly 10 shown on the left side of the front portion 12 of the vehicle 2 has a pivot axis PA indicated thereon. The pivot axis PA defines a rotational footprint RF1 of the seat assembly 10. Specifically, the rotational footprint RF1 is defined by a radius R1 which is further defined between the pivot axis PA and a feature of the seat assembly 10 disposed furthest away from the centrally disposed pivot axis PA. As used herein, the term, "rotational footprint" identifies an area in which a seat assembly occupies as it rotates from a forward-facing configuration to a rearward-facing configuration within a vehicle interior. Thus, with the seat assembly 10 shown in the configuration of FIG. 1A, the seat assembly 10 includes a first rotational footprint RF1 based on a centrally disposed pivot axis PA. In the embodiment shown in FIG. 1A, it is contemplated that the left hand seat assembly 10 includes a rotational footprint RF1, provided by its current configuration that is too large for rotation within the interior 4 of the vehicle 2. Particularly, the rotational footprint RF1 is generally defined in FIG. 1A by the parameters of a deployed seat portion 20. With reference to the seat portion 20, the terms "stowed" and "deployed" "use position" and "upright non-use position," and first and second positions may be used to describe different positions of the seat portion 20. In FIG. 1A, the seat portion 20 is shown in a deployed position, that is a substantially horizontal use position with the overall seat assembly 10 shown in a forward-facing configuration. In FIG. 1A, the seat assembly 10 is configured to support a vehicle occupant in a forward-facing configuration on the deployed seat portion 20.

Figure 1B:
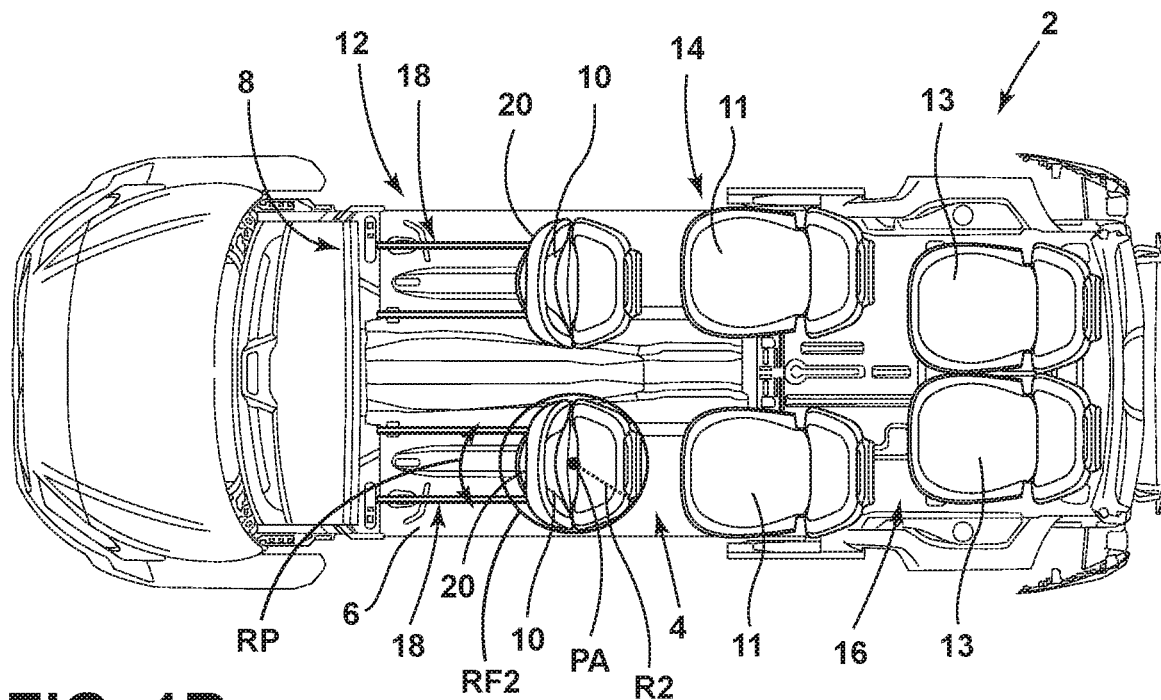
FIG. 1B is a top plan view of the vehicle of FIG. 1A with the front seat assemblies shown with the seat portion in a stowed position and a rotational footprint indicated that is less than the rotational footprint of FIG. 1A.

Referring now to FIG. 1B, the seat assemblies 10 disposed in the front portion 12 of the vehicle 2 are shown with the seat portions 20 thereof in stowed positons. As noted above, the seat assemblies 10 include seat portions 20 that are convertible between deployed and stowed positions. With the seat portion 20 in the stowed position, the overall seat assembly 10 includes a rotational footprint RF2 which is defined between the centrally disposed pivot axis PA and a radius R2 defined between the centrally disposed pivot axis PA and a feature of the seat assembly 10 disposed furthest therefrom. In comparing FIG. 1A and FIG. 1B, the rotational footprint RF2 of FIG. 1B is less than the rotational footprint RF1 of the seat assembly 10 shown in FIG. 1A. In this way, it is contemplated that the seat assembly 10 can rotate within the interior 4 of the vehicle 2 along the pivot axis PA between forward and rearward-facing configurations. Specifically, the movement of the seat portion 20 from the deployed position (FIG. 1A) to the stowed position (FIG. 1B) provides for a rotational footprint RF2 that can accommodate the pivoting movement of the seat assembly 10 within the vehicle interior 4. Having a rotational footprint RF2 when the seat portion 20 is in the stowed position provides for a seat assembly 10 that can rotate between forward-facing and rearward-facing configurations within the tight confines of the vehicle interior 4. When the seat portion 20 is in the deployed position, as shown in FIG. 1A, the rotational footprint RF1 is much greater than the rotational footprint RF2 shown in FIG. 1B, such that is contemplated that the seat portion 20 would contact a pillar, center console, door panel, or other like feature within the vehicle interior 4, thereby limiting the seat assembly's ability to rotate.

Figure 1C:
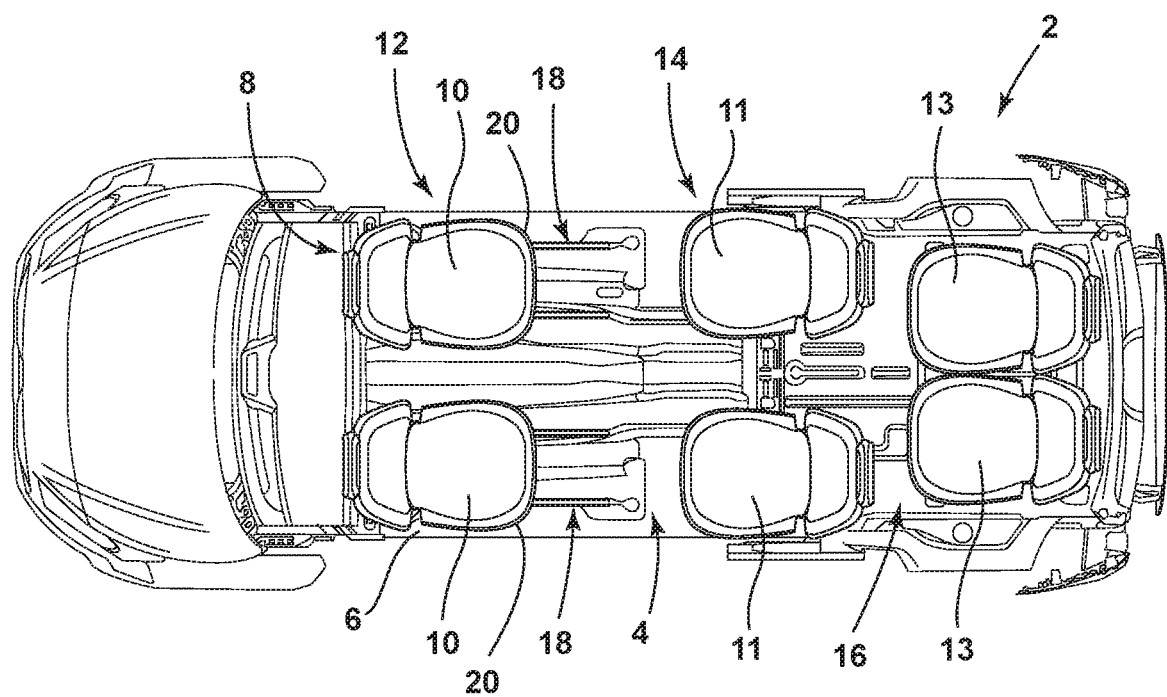
FIG. 1C is a top plan view of the vehicle of FIG. 1B showing the front seat assemblies in rearward-facing configurations.

Referring now to FIG. 1C, the front seat assemblies 10 are shown with the seat portions 20 thereof in the deployed positions with the overall seat assemblies 10 now positioned in a rearward-facing configuration. Thus, from FIG. 1B to FIG. 1C, it is contemplated that the seat assemblies 10 have rotated along the rotational path indicated by arrow RP (FIG. 1B) within the rotational footprint RF2 to provide a rearward-facing configuration for the seat assemblies 10. After rotation, it is contemplated that the seat portions 20 are moved from the stowed position (FIG. 1B) to the rearward-facing deployed position (FIG. 1C). Further, in comparing the seat assemblies' position in FIG. 1B to FIG. 1C, the seat assemblies 10 are also shown moved to a forward position along the track assemblies 18 for providing adequate legroom within the vehicle interior 4 for a seat occupant in a rearward-facing configuration.

Referring now to FIG. 2A, the seat assembly 10 is shown disposed within the vehicle interior 4 of the vehicle 2 at the front portion 12 of the vehicle 2. The instrument panel 8 of the vehicle 2 in the embodiment shown in FIG. 2A includes a steering wheel assembly 9 extending outwardly therefrom. In FIG. 2A, a seat occupant 26 is shown positioned within the seat assembly 10 in a seated position with the seat portion 20 of the seat assembly 10 in the deployed position. The seat portion 20 includes a seat frame 40 that provides structural support for the seat occupant 26. The seat frame 40 is covered by cushion materials 21 that is shown in phantom in FIGS. 2A-2C. In FIG. 2A, a swivel mechanism 30 is shown mounted on a mounting plate 36 that is slideably supported on the track assembly 18 between fore and aft positions. The swivel mechanism 30 is configured to provide the rotating movement of the seat assembly 10 between the forward-facing and rearward-facing configurations. A base frame 32 is mounted on the swivel mechanism 30 for rotational movement therewith. In the embodiment shown in FIG. 2A, a lift mechanism 34 is shown disposed between the seat portion 20 and the base frame 32. The lift mechanism 34 is configured to provide vertical adjustment of the seat portion 20 between raised and lowered positions. In FIG. 2A, the seat portion 20 is shown in a lowered position. With the swivel mechanism 30 coupled to the base frame 32 of the seat assembly 10, the entire seat assembly 10 is configured to rotate along the pivot axis PA which is centrally disposed on the swivel mechanism 30. In FIG. 2A, a radius R1 is defined between the centrally disposed pivot axis PA and a front edge 28 of the seat portion 20. Thus, it is contemplated that the front edge 28 of the seat portion 20 defines the furthest point, or forward-most portion, of the seat assembly 10 from the pivot axis PA to define the rotational footprint RF1 (FIG. 1A) of the seat assembly 10. The front edge 28 of the seat portion 20 may be defined by a front edge 42 (FIGS. 3, 4A, 4B) of the seat frame 40, or may be a forward-most portion of the cushion materials 21 as coupled to the seat frame 40. As further shown in FIG. 2A, the floorboard 6 of the vehicle 2 includes a raised rear portion 6A which is configured to support seat assemblies 11 (FIG. 1A) at the intermediate portion 14 of the vehicle interior 4.

Figure 2B:
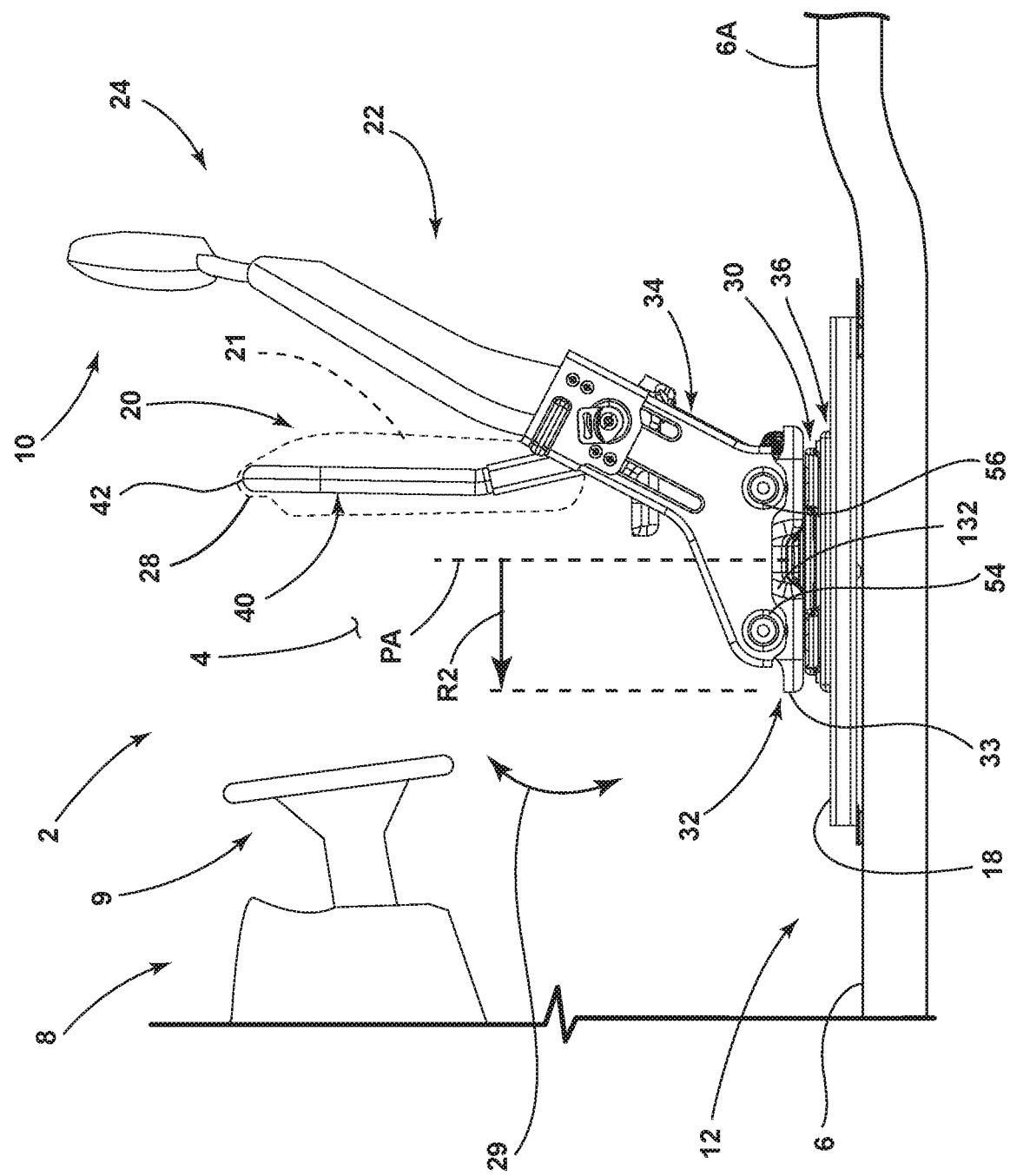
FIG. 2B is a side elevational view of the seat assembly of FIG. 2A with the seat portion shown in a stowed position.

Referring now to FIG. 2B, the seat assembly 10 is shown with the seat portion 20 disposed in the stowed position. It is contemplated that the seat portion 20 moves from the deployed position (FIG. 2A) to the stowed position (FIG. 2B) by pivoting upward along the path as indicated by arrow 29. In FIG. 2B, the radius R2 is defined between the centrally disposed pivot axis PA and a forward-most portion of the seat assembly 10, which is contemplated to be a front edge 33 of the base frame 32, or may be any perimeter edge of the base frame 32. This is due to the front edge 33 of the base frame 32 being disposed outwardly in a forward direction beyond the front edge 42 of the seat frame 40 when the seat frame 40 is in the upright non-use or stowed position. Thus, the radius R2 is used to define the rotational footprint RF2 (FIG. 1B) of a lower portion of the seat assembly 10 to minimize the rotational footprint of the seat assembly 10 for rotation within the vehicle interior 4. It is further contemplated that the seatback 22 can move to a vertical positon to further reduce the rotational footprint of an upper portion of the seat assembly 10. As further shown in FIG. 2B, the front edge 28 of the seat portion 20 is vertically juxtaposed over the lower portion of the seat assembly 10. Similarly, the front edge 42 of the seat frame 40 is shown as being vertically juxtaposed over the lower portion of the seat assembly 10 in FIG. 2B. The lift mechanism 34, the base frame 32 and the swivel mechanism 30 define the lower portion of the seat assembly 10. As used herein, the term "vertically juxtaposed" is used to describe a component or feature that is positioned vertically above and over another feature. Specifically, the front edge 28 of the seat portion 20 and the front edge 42 of the seat frame 40 are shown vertically disposed above the swivel mechanism 30, such that the front edges 28, 42 are vertically juxtaposed over the swivel mechanism 30. In comparison, the front edge 28 of the seat portion 20 and the front edge 42 of the seat frame 40 are shown in FIG. 2A as being vertically above the lift mechanism 34, the swivel mechanism 30 and the front edge 33 of the base frame 32. However, the front edges 28, 42 are shown in FIG. 2A as being positioned in a forward direction beyond the lift mechanism 34, the swivel mechanism 30 and the front edge 33 of the base frame 32. In FIG. 2B, the front edge 28 of the seat portion 20 and the front edge 42 of the seat frame 40 are disposed above and over the lift mechanism 34, the swivel mechanism 30 and the base frame 32, such that the front edge 28 of the seat portion 20 and the front edge 42 of the seat frame 40 are shown in FIG. 2B as vertically juxtaposed over the lift mechanism 34, the swivel mechanism 30 and the base frame 32, when the seat portion 20 is in the stowed position. Put differently, the components of the lower portion of the seat assembly 10 have a footprint. These components include the mounting plate 36, the lift mechanism 34, the base frame 32 and the swivel mechanism 30. When the seat portion 20, or the seat frame 40, is vertically juxtaposed to any one of the aforementioned components, the seat portion 20 and seat frame 40, and/or the front edges 28, 42 thereof, are contemplated to be vertically positioned above and within the footprint of the referenced component.

As noted above, the seat portion 20 of the seat assembly 10 is configured to pivotally move between the deployed position (FIG. 2A) and the stowed position (FIG. 2B) along the path as indicated by arrow 29 (FIG. 2B). The deployed position of the seat portion 20 provides for an upper surface configured for supporting a seat occupant thereon. As such, the deployed position of the seat portion 20 may be referred to herein as a "use position" or a "horizontal use position." With reference to FIG. 2B, the seat portion 20 is shown in the stowed position, which may also be referred to herein as the "upright non-use position." The seat portion 20 is considered to be in a non-use position when the seat portion 20 is in the stowed position due to the highly increased angle of the seat portion 20 when in the stowed position. Thus, while known seat assemblies may provide for a seat portion that can adjust to provide various angled configurations, the seat assembly 10 of the present concept provides for a seat portion 20 and seat frame 40 which can move to upright non-use positions, wherein front edges 28, 42 thereof are vertically juxtaposed over a lift mechanism 34, a base frame 32 and/or a swivel mechanism 30. Such dynamic angle adjustment of a seat portion is not found in seat assemblies which provide for fine tuning the angle of the seat portion for comfort adjustments only. With this range of movement, the seat portion 20 of the present concept provides for a seat portion that can effectively reduce the rotational footprint of the overall seat assembly 10 for accommodating pivoting movement of the seat assembly 10 within a vehicle interior.

Figure 2C:
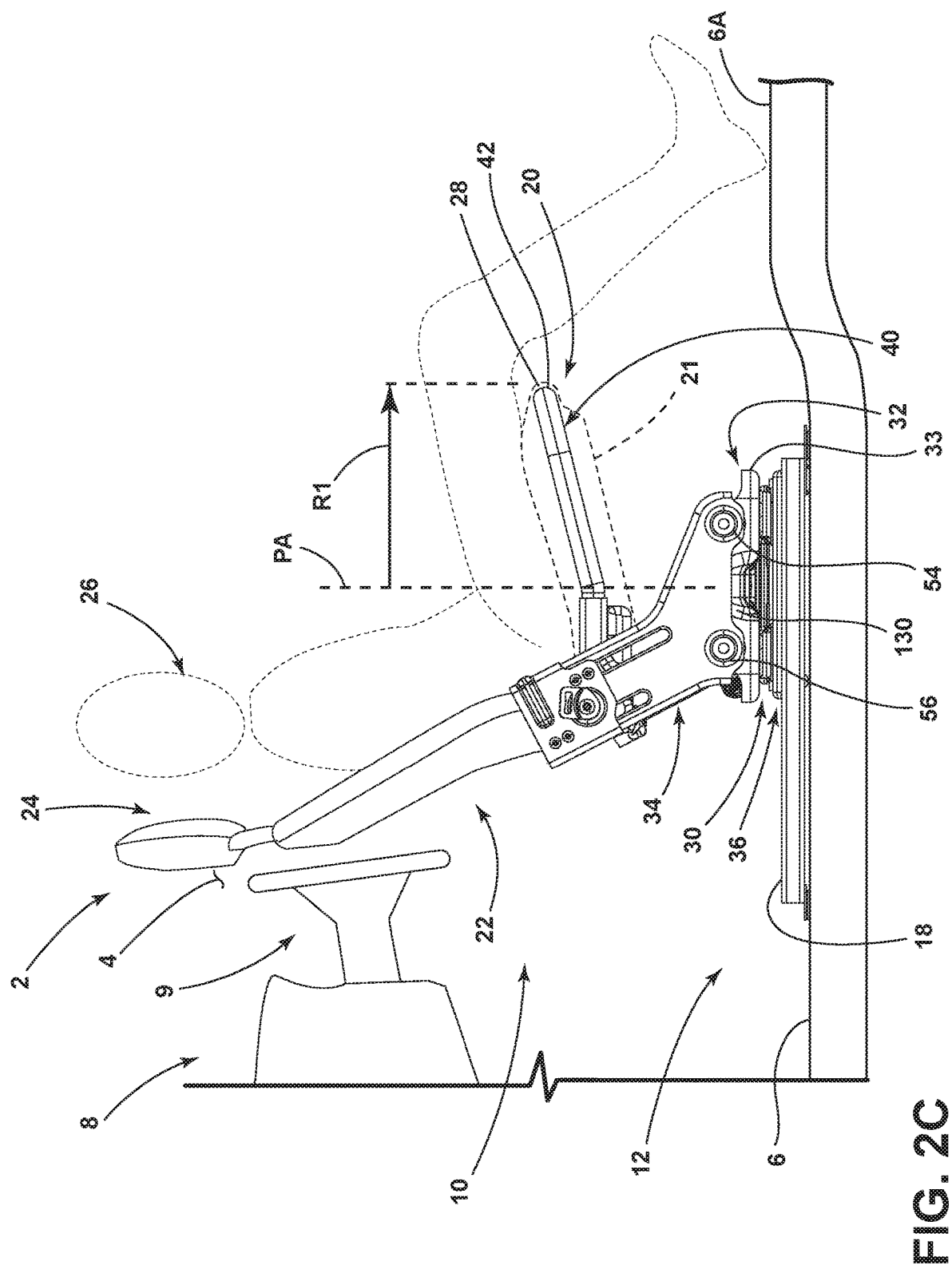
FIG. 2C is a side elevational view of the vehicle seat of FIG. 2A with the vehicle seat in a rearward-facing configuration.

Referring now to FIG. 2C, the seat occupant 26 is shown seated in the seat assembly 10 in a rearward-facing configuration. As seated in the seat assembly 10, the feet of the seat occupant 26 are positioned on the raised portion 6A of the floorboard 6. As such, the seat portion 20 has been raised to a raised position by the lift mechanism 34 to accommodate for the seat occupant's feet being supported on a raised portion 6A of the floorboard 6. With the seat portion 20 shown in the deployed or use position in FIG. 2C, the seat assembly 10 includes a radius R1 defined between the centrally disposed pivot axis PA and the front edge 28 of the seat portion 20 which is no longer vertically juxtaposed over the lift mechanism 34, but rather extending forward from the lift mechanism 34 above the lift mechanism 34. It is further contemplated that in the rearward-facing configuration, the seat assembly 10 may be disposed on a side of the front portion 12 of the vehicle interior 4 where the seat assembly 10 can move towards the instrument panel 8 on the track assembly 18 to provide more legroom for other occupants that may be seated in seat assemblies positioned in the intermediate portion 14 of the vehicle 2, such as seat assemblies 11 shown in FIG. 1A.

Figure 3:
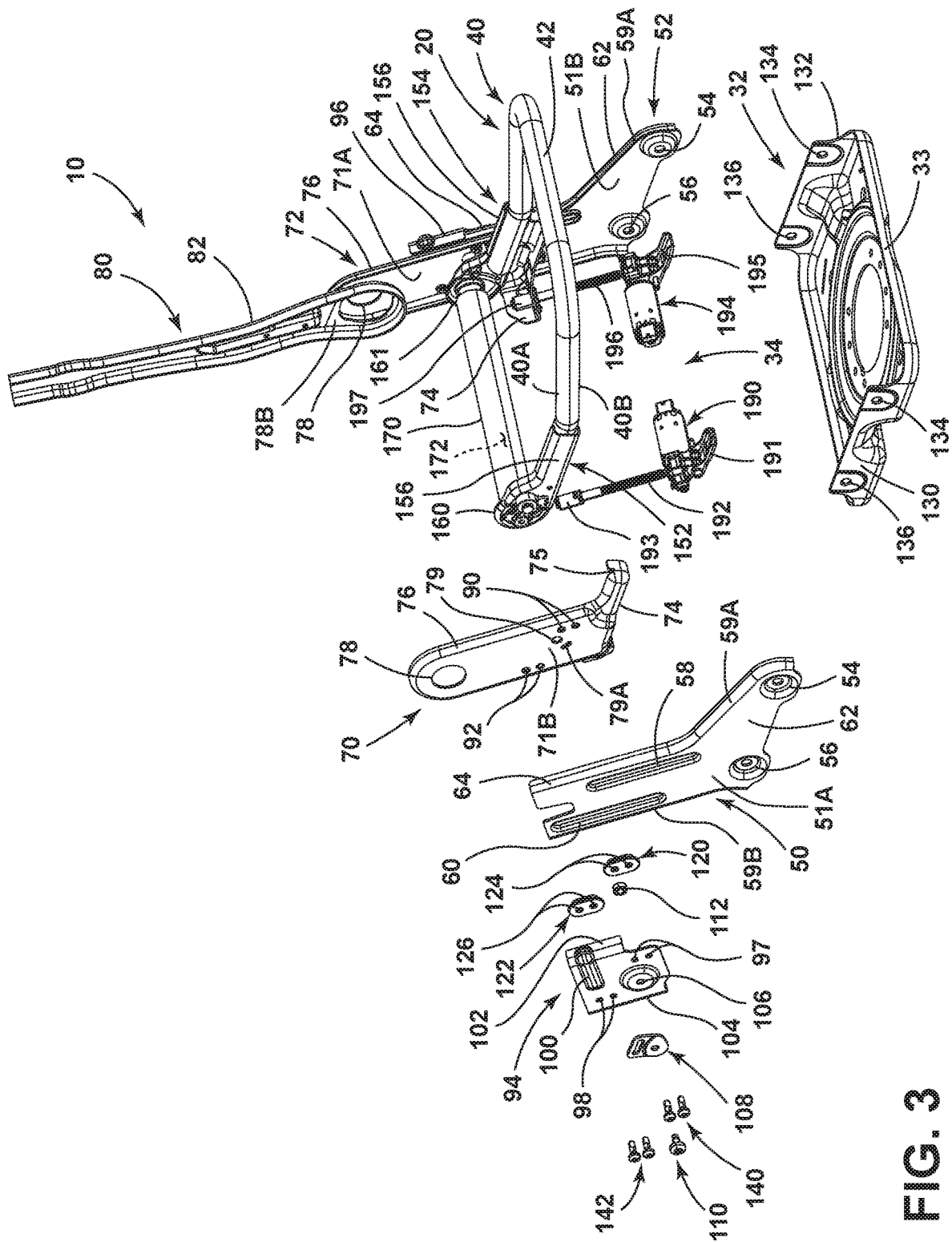
FIG. 3 is an exploded top perspective view of a seat portion and a lift mechanism.

Referring now to FIG. 3, the seat portion 20 is shown with features of the lift mechanism 34 and the base frame 32 exploded away therefrom. As specifically shown in FIG. 3, the seat assembly 10 includes first and second guide brackets 50, 52. The first and second guide brackets 50, 52 each include front and rear mounting apertures 54, 56 as well as front and rear slots 58, 60 disposed therethough. In assembly, the first and second guide brackets 50, 52 are mounted to opposed first and second sides 130, 132 of the base frame 32, respectively. As shown in FIG. 3, the base frame 32 includes the first and second sides 130, 132 having mounting apertures 134, 136 which may be referred to herein as front and rear mounting apertures, respectively. As such, the front and rear mounting apertures 54, 56 of the guide brackets 50, 52 are configured to mount to the front and rear mounting apertures 134, 136, respectively, of the base frame 32 in an assembled condition. The front and rear mounting apertures 54, 56 are disposed on a base portion 62 of the first and second guide brackets 50, 52, while the front and rear slots 58, 60 are disposed on an upper portion 64 which upwardly extends from the base portion 62. The front and rear slots 58, 60 are contemplated to be equal in length and spaced-apart from one another on the upper portion 64 of the first and second guide brackets 50, 52.

As further shown in FIG. 3, the seat assembly 10 further includes first and second support brackets 70, 72 each having inner and outer surfaces 71A, 71B. The first and second support brackets 70, 72 include base portions 74 and upper portions 76. As shown in FIG. 3, the base portions 74 forwardly extend from the upwardly extending upper portions 76. Support tabs 75 inwardly extend from the forwardly extending base portions 74, and are used to support the seat frame 40 when the seat frame 40 is in the deployed position. A mounting aperture 78 is disposed through the upper portions 76 of the first and second support brackets 70, 72, and is configured to receive a recliner mechanism 78A (FIG. 4A) for pivotally coupling arms 81, 82 (FIG. 4A) of a seatback frame 80 thereto. The upper portions 76 of the first and second support brackets 70, 72 further include pivot apertures 79 disposed therethrough for pivotally coupling the seat frame 40 thereto. The upper portion 76 of the first support bracket 70 further includes a slot 79A disposed therethrough for receiving a tab 208 of a fixed gear assembly 204 (FIGS. 7A, 7B) thereto. The upper portions 76 of the first and second support brackets 70, 72 further include first and second sets of mounting apertures 90, 92 disposed therethrough. The sets of mounting apertures 90, 92 are used to slidably couple the first and second support brackets 70, 72 to the inner surfaces 51B of the first and second guide brackets 50, 52, respectively, for movement between raised and lowered positions. The first and second guide brackets 50, 52 further include outer surfaces 51A to which first and second retainer brackets 94, 96 are configured to couple, respectively. Much like the first and second support brackets 70, 72, the first and second retainer brackets 94, 96 are configured to slidingly couple to the outer surface 51A of the first and second guide brackets 50, 52, respectively, for movement between raised and lowered positions. The coupling of the first retainer bracket 94 to the first guide bracket 50 and the first support bracket 70 is further described below. With the second retainer bracket 96, the second guide bracket 52 and the second support bracket 72 being of a similar, but mirrored, configuration, it is contemplated that the description herein of the coupling of the first retainer bracket 94 to other components of the lift mechanism 34 will be the same for the coupling of the second retainer bracket 96.

As specifically shown in FIG. 3, the first retainer bracket 94 includes first and second sets of mounting apertures 97, 98 disposed through a body portion 100 thereof. A front tab 102 of the first retainer bracket 94 inwardly extends from the body portion 100 thereof. The front tab 102 of the first retainer bracket 94 is configured to wrap around a front edge 59A of the first guide bracket 50 in assembly. The first retainer bracket 94 further includes a rear tab 104 inwardly extending from the body portion 100 which is configured to wrap around a rear edge 59B of the first guide bracket 50 in assembly. The first retainer bracket 94 further includes a generally centrally disposed mounting aperture 106 which is configured to receive a buckle bracket 108 that is held in place by fastener 110 and nut 112. To slidably connect the first retainer bracket 94 and the first support bracket 70 to the first guide bracket 50 at the outer and inner surfaces 51A, 51B, respectively, of the first guide bracket 50, first and second guide members 120, 122 are configured to be received in the front and rear slots 58, 60 of the first guide bracket 50 in a slidable manner. The first and second guide members 120, 122 include sets of mounting apertures 124, 126 disposed therethrough. In assembly, the first and second sets of mounting apertures 97, 98 of the first retainer bracket 94 are configured to align with the mounting apertures 124, 126 of the first and second guide members 120, 122 which are further configured to align with the first and second sets of mounting apertures 90, 92 of the first support bracket 70. The connection of the mounting apertures 96, 124 and 90 of the first retainer bracket 94, the first guide member 120 and the first support bracket 70, respectively, is provided via fasteners 140. Fasteners 142 are used to interconnect the first retainer bracket 94, the second guide member 122 and the first support bracket 70 through mounting apertures 98, 126 and 92, respectively. Thus, in assembly, the first retainer bracket 94 and the first support bracket 70 are coupled to one another around the first guide bracket 50, such that the first guide bracket 50 is sandwiched in between the first retainer bracket 94 and the first support bracket 70 in assembly.

As noted above, the first and second guide members 120, 122 are received in the front and rear slots 58, 60, respectively, such that the guide members 120, 122 are also sandwiched between the first retainer bracket 94 and the first support bracket 70. As noted above, many of the above noted features coupled to the first guide bracket 50 are slidably coupled thereto, such that the first retainer bracket 94, the first and second guide members 120, 122 and the first support bracket 70 move in the vertical direction provided by the front and rear slots 58, 60 of the first guide bracket 50 along the first guide bracket 50. Movement along the front and rear slots 58, 60 may be slightly angled rearwardly, but is substantially vertical. As noted above, the description of the first retainer bracket 94 being coupled to the first guide bracket 50 and the first support bracket 70 is the same, but in a mirrored configuration, with respect to the second retainer bracket 96, as coupled to the second guide bracket 52, as further coupled to the second support bracket 72.

As further shown in FIG. 3, the seat frame 40 includes first and second pivot brackets 152, 154 which each include a mounting portion 156 having a generally C-shaped configuration for coupling to upper and lower portions 40A, 40B of the seat frame 40. The pivot brackets 152, 154 further include pivot apertures 158 (FIG. 4A) disposed through end portions 160, 161 of the pivot brackets 152, 154, respectively. Through the pivot apertures 158 of the pivot brackets 152, 154, the seat frame 40 is pivotally coupled to the pivot apertures 79 of the first and second support brackets 70, 72, respectively, for movement of the seat frame 40 between the use position and the upright non-use position with respect to the first and second support brackets 70, 72. Thus, the end portions 160, 161 of the pivot brackets 152, 154 define opposed first and second ends of the seat frame 40 that are pivotally coupled to the support brackets 70, 72. As further shown in FIG. 3, a cross member 170 is disposed between and interconnects the opposed first and second ends 160, 161 of the seat frame 40. The cross member 170 includes an interior portion 172 which houses an actuator 200 (FIGS. 7A and 7B) for driving the seat portion 20 and the seat frame 40, between the use position and the upright non-use position, as further described below. As shown, the cross member 170 is disposed on an opposite side of the seat frame 40 relative to the front edge 42 of the seat frame 40.

Figure 4B:
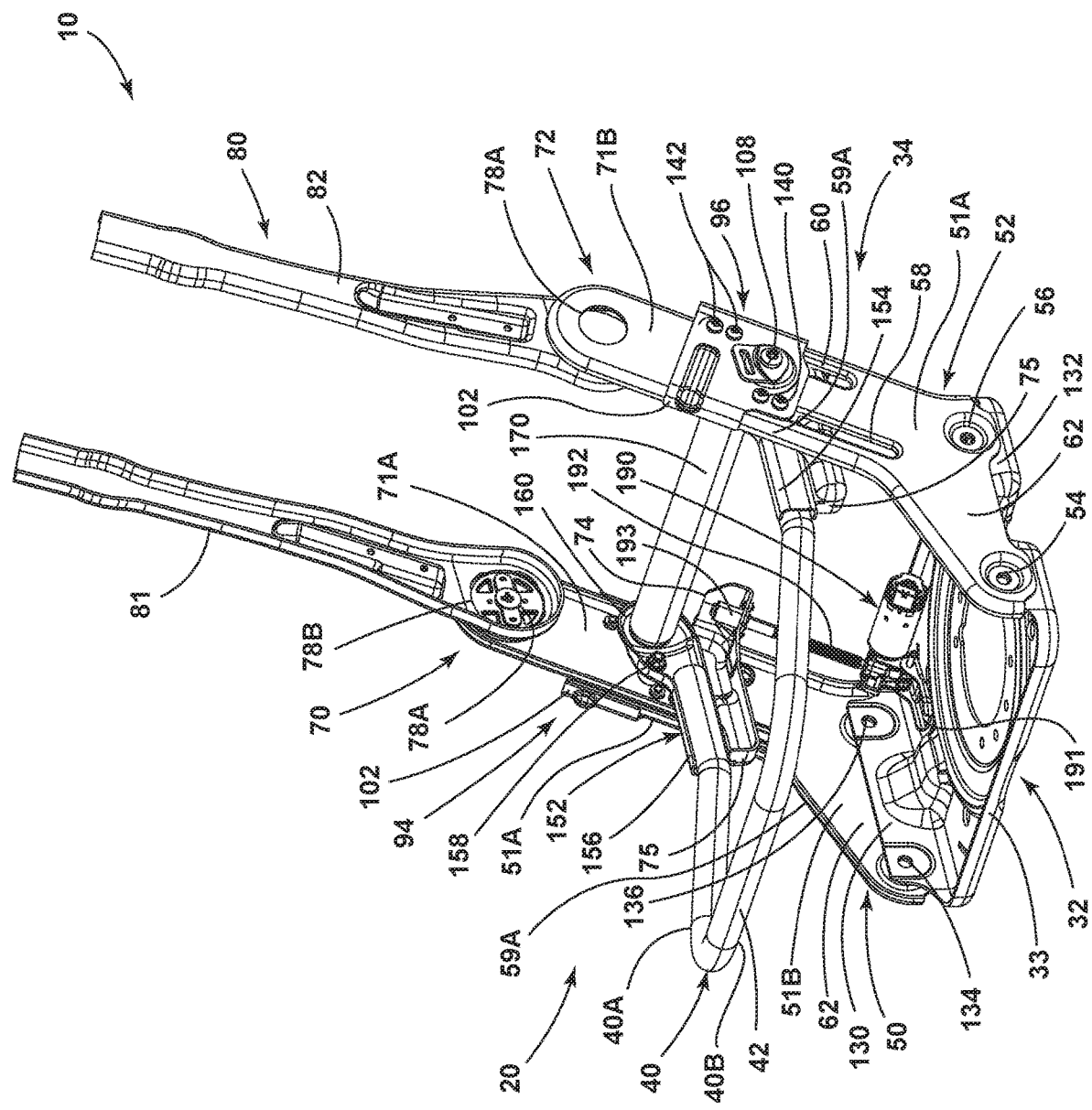
FIG. 4B is a top perspective view of the seat portion and lift mechanism of FIG. 4A with the seat portion and seatback frame in a raised position.
Figure 5:
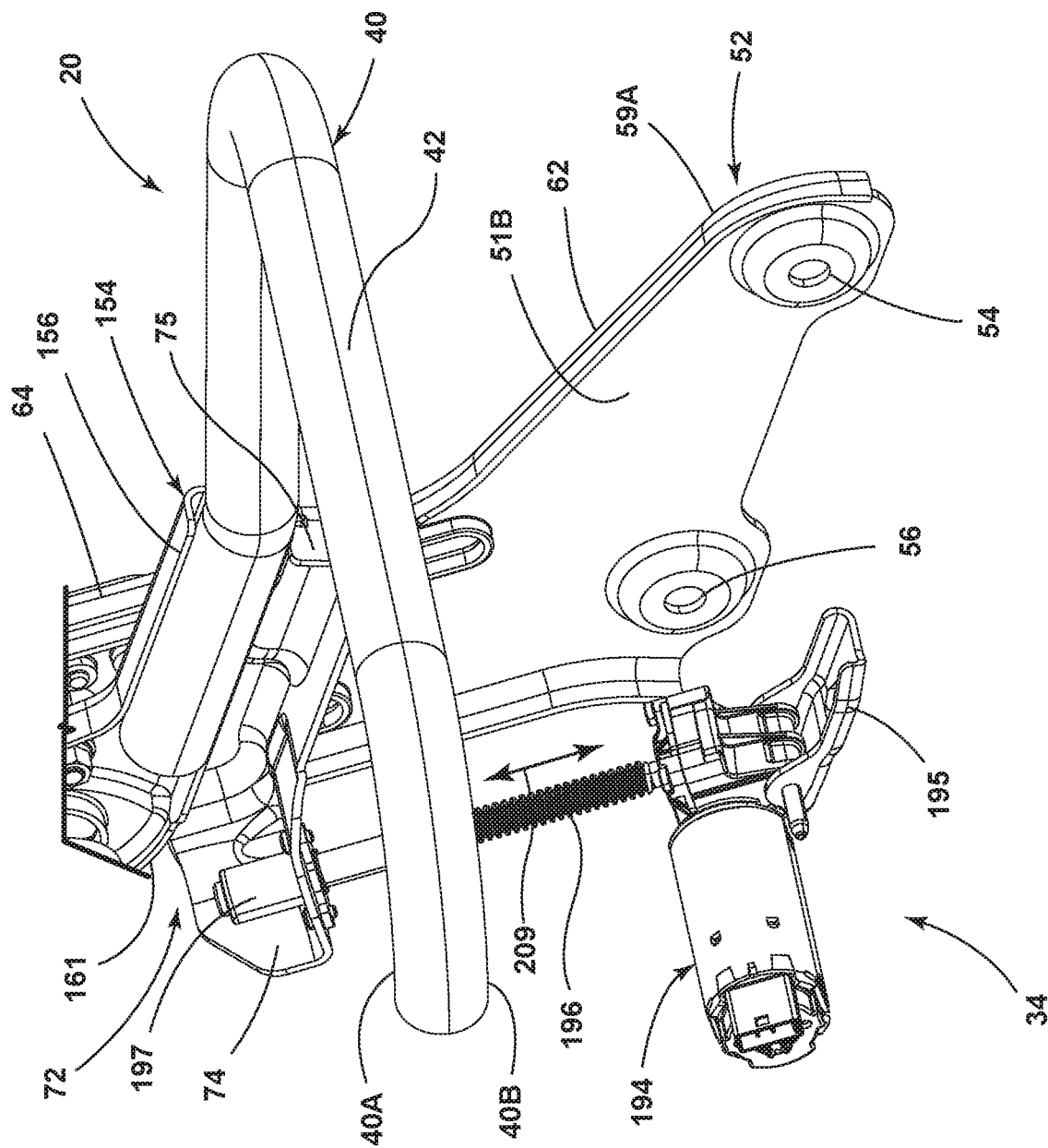
FIG. 5 is a fragmentary zoomed-in top perspective view of the lift mechanism and seat portion of FIG. 4B.

With further reference to FIG. 3, actuators 190, 194 each include threaded drive shafts 192, 196, respectively, which are configured to engage threaded members 193, 197 which are disposed on the base portions 74 of the first and second support brackets 70, 72, respectively. In use, the drive shafts 192, 196 of the actuators 190, 194 engage the threaded members 193, 197 to drive the lift mechanism 34 between raised and lowered positions by raising and lowering the support brackets 70, 72, and the retainer brackets 94, 96 and guide members 120, 122 coupled thereto, along the upper portions 64 of the first and second guide brackets 50, 52. Engagement of the drive shaft 196 of the actuator 194 with the threaded member 197 of the second support bracket 72 is best shown in FIG. 5. As further shown in FIG. 3, the first and second actuators 190, 194 include mounting portions 191, 195, respectively, for fixedly mounting the actuators 190, 194 to the base frame 32 as shown in FIG. 4B. Thus, with the actuators 190, 194 fixedly mounted to the base frame 32, the driving movement of the threaded drive shafts 192, 196 with the threaded members 193, 197 provides for the sliding movement of the first and second support brackets 70, 72 with respect to the first and second guide brackets 50, 52. In this way, the lift mechanism 34 can move in a linear elevating manner between raised and lowered positions to move both the seat portion 20 and the seatback 22 of the seat assembly 10 simultaneously.

In order to accommodate various sized seat occupants and multi-level floor boards within a vehicle, the seat assembly 10 is configured to provide a range of vertical movement that can meet the needs of a seat occupant within various vehicle interiors. Specifically, the lift mechanism 34 described above may include a vertical range of travel between 0-100 millimeters between the raised and lowered positions.

Figure 4A:
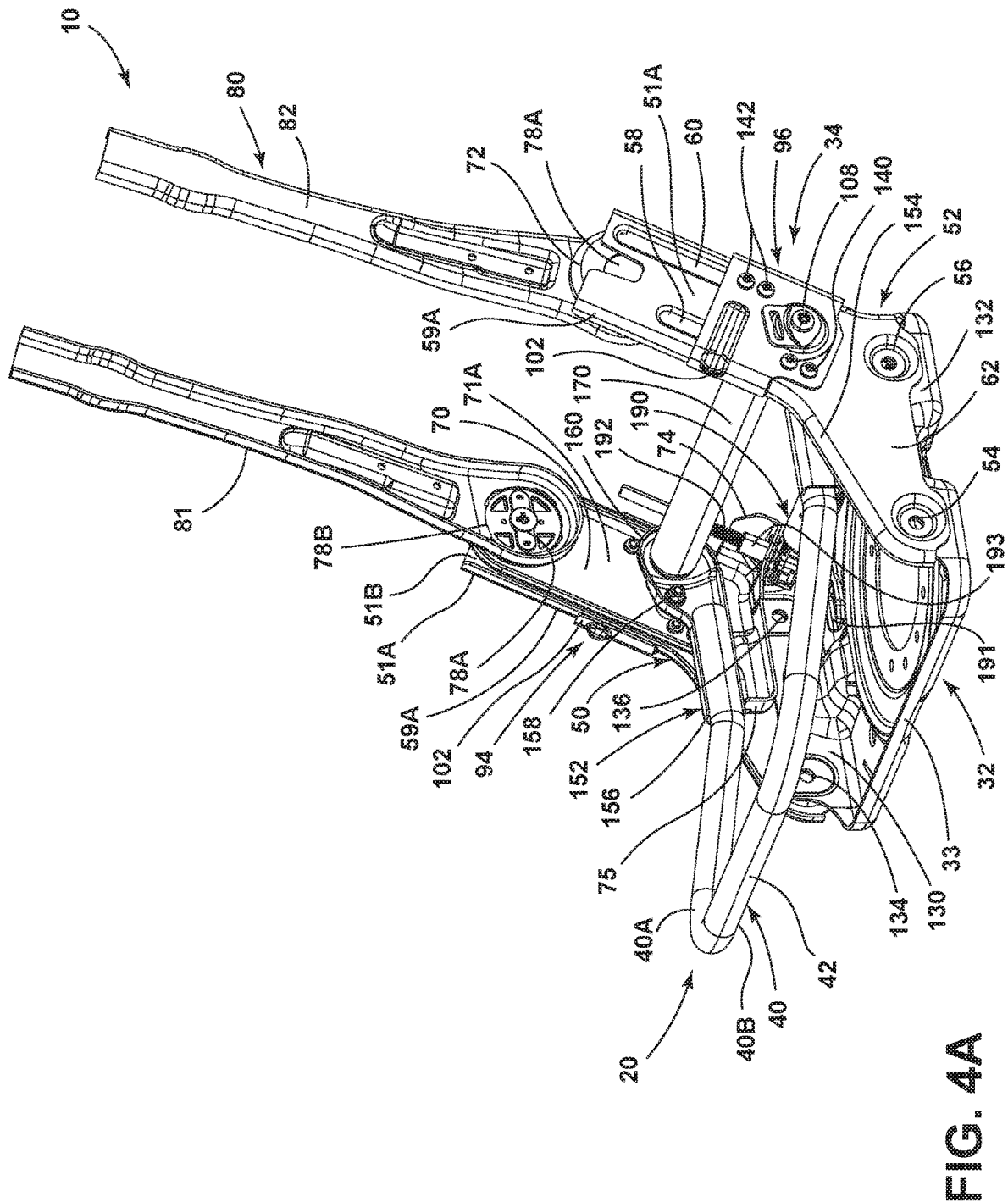
FIG. 4A is a top perspective view of the seat assembly portion and lift mechanism of FIG. 3 as assembled, with the seat portion and a seatback frame in a lowered position.

Referring now to FIG. 4A, the seat assembly 10 is shown with a seatback frame 80 having first and second arms 81, 82 upwardly extending from and interconnected with the first and second support brackets 70, 72, respectively, by recliner mechanisms 78A. The recliner mechanisms 78A are received in the mounting apertures 78 of the first and second support brackets 70, 72 as well as mounting apertures 78B of the first and second arms 81, 82 of the seatback frame 80. In FIG. 4A, the seat portion 20 of the seat assembly 10 is shown in a lowered position via the lift mechanism 34. The seat portion 20 is further shown with the seat frame 40 thereof in the deployed position. In FIG. 4A, the first guide bracket 50 is shown with the first support bracket 70 coupled to the inner surface 51B of the first guide bracket 50, and the first retainer bracket 94 coupled to the outer surface 51A of the first guide bracket 50. Similarly, the second guide bracket 52 is shown coupled between the second support bracket 72 and the second retainer bracket 96. Specifically, the second retainer bracket 96 is slidably coupled to the outer surface 51A of the second guide bracket 52, while the second support bracket 72 is slideably coupled to an inner surface 51B of the second guide bracket 52. In FIG. 4A, the underside or lower portion 40B of the seat frame 40 is shown being supported on the inwardly extending support tab 75 of the first support bracket 70. As further shown in FIG. 4A, the front tabs 102 of the first and second retainer brackets 94, 96 are shown wrapped around the front edges 59A of the first and second guide brackets 50, 52, respectively.

Referring now to FIG. 4B, the lift mechanism 34 has lifted the seat portion 20 and the seat frame 40 thereof to the raised position, such that the first and second support brackets 70, 72 are in a raised position as having slid upwardly along the guide brackets 50, 52, respectively. As further shown in FIG. 4B, the seatback frame 80 has moved upward in the same direction as coupled to the first and second support brackets 70, 72. As specifically shown in FIG. 4B, the drive shaft 192 of actuator 190 is shown threadingly engaged with threaded member 193 which is coupled to the first support bracket 70 along the base portion 74 thereof. As noted above, the base portion 74 is a forwardly extending portion relative to the upper portion 76 of the first support bracket 70.

As shown in FIGS. 4A and B, the fasteners 140, 142 are shown coupled to the second retainer bracket 96 and are further contemplated to be coupled to the first and second guide members 120, 122, and further coupled to the mounting apertures 90, 92 of the second support bracket 72. In this way, the fasteners 140, 142 couple the first and second guide members 120, 122 to the second retainer bracket 96 on a first side of the first and second guide members 120, 122, and further couple the first and second guide members 120, 122 to the second support bracket 72 at an opposite second side of the first and second guide members 120, 122.

Referring now to FIG. 4C, the seat assembly 10 is shown from a rear perspective view with the lift mechanism 34 lifting the seat portion 20 and the seat frame 40 thereof to a raised position. Further, the seat portion 20 and the seat frame 40 are shown pivoted upward to the upright non-use position. In this position, it is contemplated that the front edge 42 of the seat frame 40 is vertically juxtaposed over a swivel mechanism 30, as described above with reference to FIG. 2B. In FIG. 4C, a fixed gear assembly 204 is shown mounted to the inner surface 71B of first support bracket 70. The fixed gear assembly 204 is used to drive the seat portion 20, and the seat frame 40 thereof, between the use and non-use positions, as further described below. Pivoting movement of the seat portion 20, and the seat frame 40 thereof, between the use and non-use positions is provided along pivot axis PA2 disposed in an offset configuration relative to the rear cross member 170 of the seat frame 40. As further shown in FIG. 4C, rear tabs 104 of the first and second retainer brackets 94, 96 are shown wrapped around the rear edges 59B of the first and second guide brackets 50, 52, respectively. The actuators 190, 194 of FIG. 4C are shown having moved the support brackets 70, 72 upward to a fully raised position. Thus, the actuators 190, 194 are operably coupled between the base frame 32 and the first and second support brackets 70, 72 for driving the first and second support brackets 70, 72 between the raised and lowered positions. As noted above, the lift mechanism 34 of the preset concept may provide a vertical range of travel between 0 and 100 millimeters between the lower position (FIG. 4A) and the raised position (FIGS. 4B and 4C).

Referring now to FIG. 5, the drive shaft 196 of actuator 194 is shown threadingly engaged with the threaded member 197 for vertical movement along the path as indicated by arrow 209. The threaded member 197 is shown mounted to the second support bracket 72 along the base portion 74 thereof. As further shown in FIG. 5, the underside or lower portion 40B of the seat frame 40 is shown being supported on the inwardly extending support tab 75 of the second support bracket 72 when the seat frame 40 is in the use position. As noted above, it is contemplated that the mounting portion 195 of the actuator 194 will be mounted to the base frame 32 for fixedly coupling the actuator 194 thereto.

Referring now to FIGS. 6A and 6B, the seat assembly 10 is shown in the lowered position in FIG. 6A with the seat portion 20, and the seat frame 40 thereof, in the deployed or use position. Further, the seat portion 20 and the seatback 22 are shown in the lowered position in FIG. 6A. With reference to FIG. 6B, the seat portion 20 and the seatback 22 have been moved to the raised position by the lift mechanism 34. Further, it is shown in FIG. 6B that the seat portion 20, and the seat frame 40 thereof, have been moved to the upright non-use position, as compared to the deployed position shown in FIG. 6A. In FIG. 6B the seatback 22 has also been moved forward to a vertical position from the partially reclined use position shown in FIG. 6A. Thus, it is contemplated that when the seat portion 20 moves to upright non-use position, the rotational footprint of the seat assembly 10 is reduced from the rotational footprint of the seat assembly 10 as shown in FIG. 6A. Further, it is contemplated that when the seatback 22 is moved to the vertical position from the partially reclined position, the rotational footprint of the overall seat assembly 10 is again reduced. Thus, in the embodiment shown in FIG. 6B, the seat assembly 10 is prepared for rotation within a vehicle interior having maximized the reduction of the rotational footprint of the upper and lower portions of the seat assembly 10.

Figure 7A:
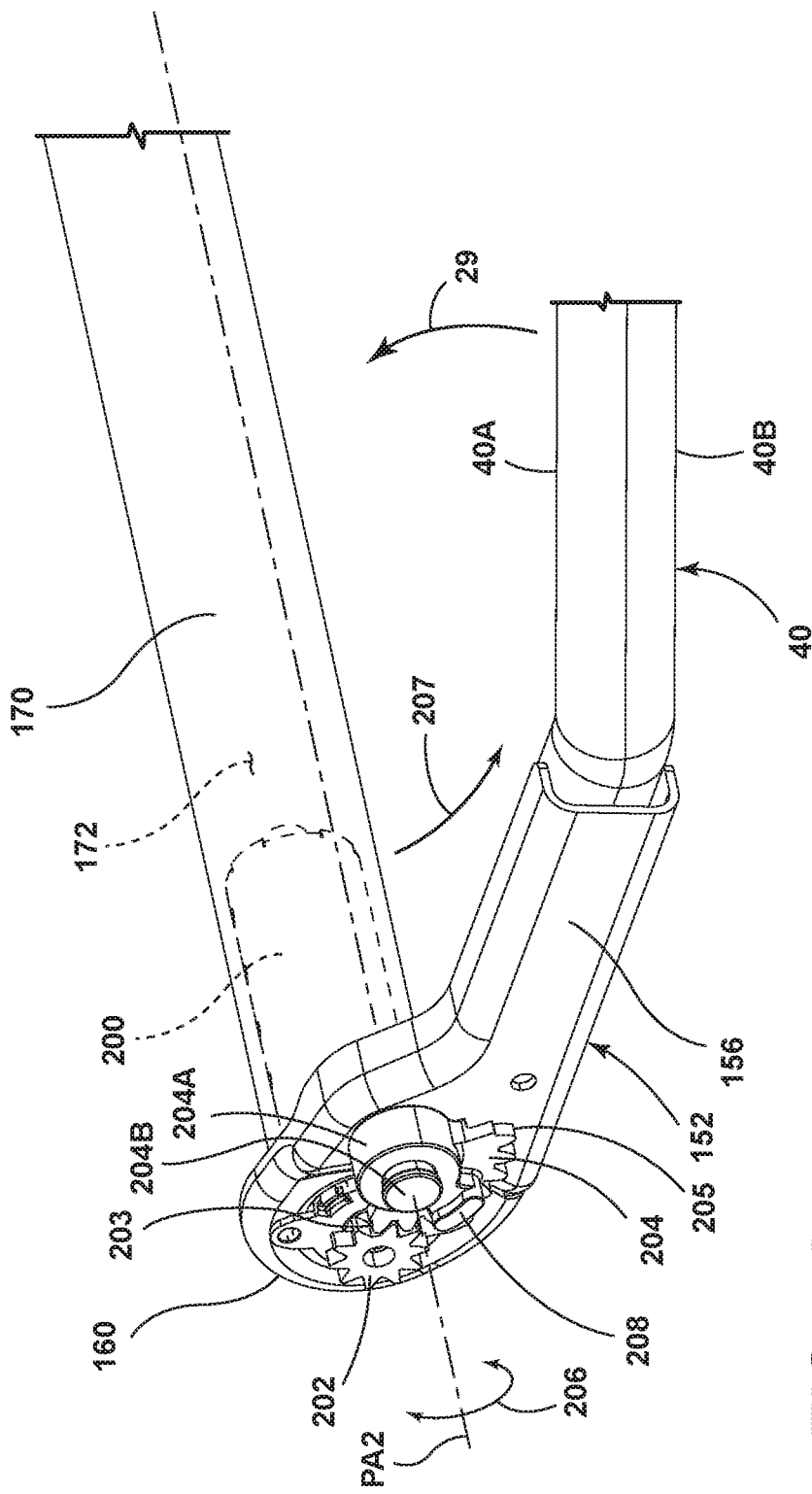
FIG. 7A is a fragmentary top perspective view of the seat portion in the deployed position having a concealed actuator shown in phantom within an interior of a cross member.
Figure 7B:
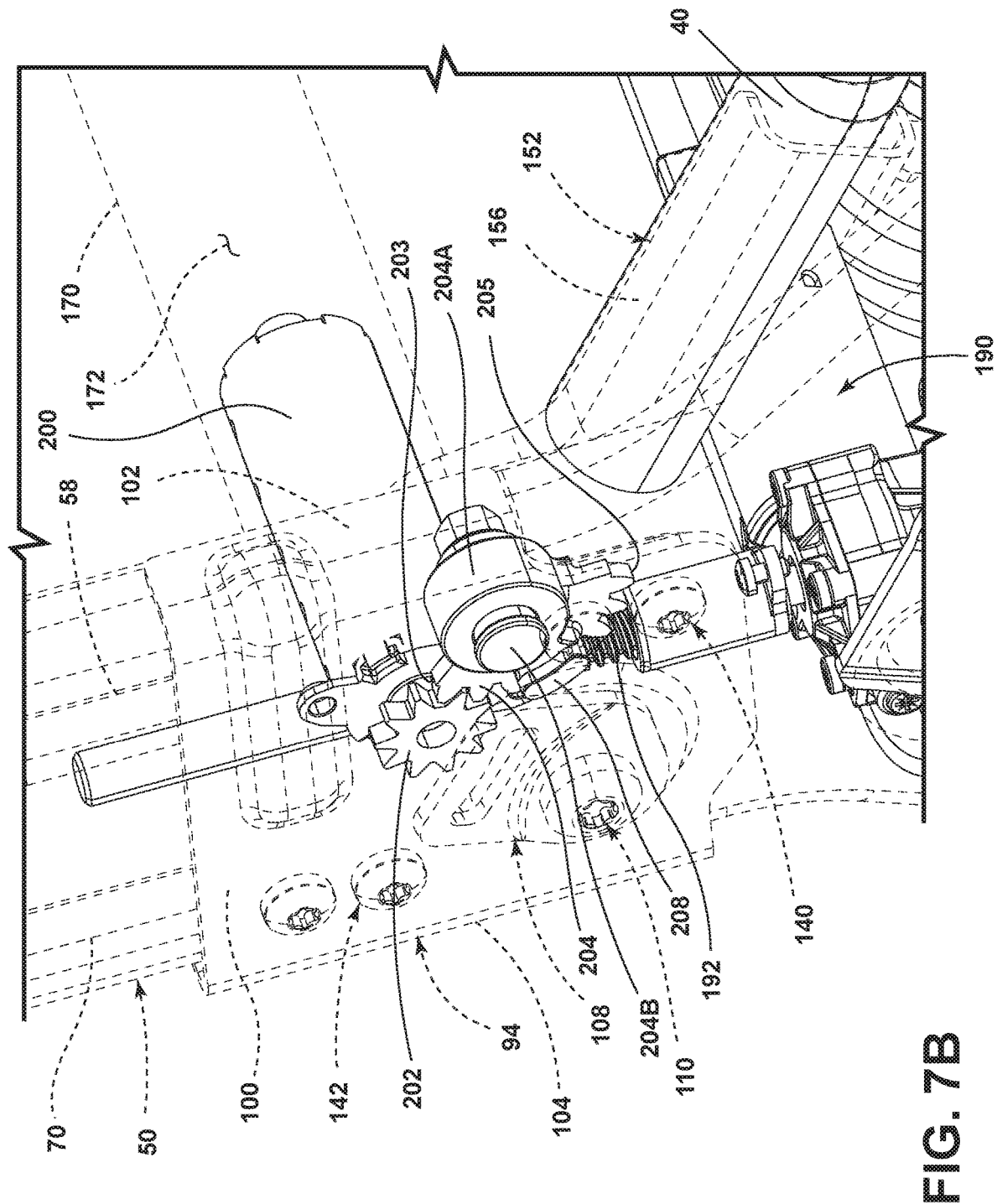
FIG. 7B is a fragmentary top perspective view of the seat portion of FIG. 7A within a seat assembly with the cross member and a lift mechanism shown in phantom to reveal the concealed actuator.

Referring now to FIG. 7A, portions of the seat frame 40 are illustrated with the first pivot bracket 152 shown coupled to the rear cross member 170. The interior portion 172 of the rear cross member 170 is shown as housing an actuator 200 therein. The actuator 200 is coupled to a drive gear 202 for rotational movement. It is contemplated that the drive gear 202 is mounted to a drive shaft rotated by the actuator 200 in use. As shown in FIG. 7A, the drive gear 202 is disposed outside of the interior portion 172 of the rear cross member 170. Having the actuator 200 disposed within the interior portion 172 of the rear cross member 170 provides for a concealed arrangement for the actuator 200 as coupled between the seat frame 40 and a support bracket (70, 72). The fixed gear assembly 204 is shown in FIG. 7A and is contemplated to be mounted to the inner surface 71B of the first support bracket 70, as shown in FIG. 4C. The fixed gear assembly 204 further includes an outwardly extending tab 208 which is configured to be received in slot 79A of the first support bracket 70 as shown in FIG. 3. With the outwardly extending tab 208 of the fixed gear assembly 204 being received in the slot 79A of the first support bracket 70, the fixed gear assembly 204 is configured to be fixedly coupled to the inner surface 71B of the first support bracket 70. The drive gear 202 of actuator 200 is engaged in a geared relationship with fixed gear assembly 204, such that when pivoting the seat frame 40 to the upright non-use position, it is contemplated that the actuator 200 will drive the drive gear 202 in a counted clockwise direction, such that the drive gear 202 will move from a first position 203 on the fixed gear assembly 204 towards a second position 205 along the fixed gear assembly 204. Movement of the drive gear 202 in the counted clockwise direction will rotate the rear cross member 170 in a downward rotational movement as indicated by arrow 207, while the seat frame 40 moves upward in the direction as indicated by arrow 29 (also shown in FIG. 2B). The rotational movement of the seat frame 40 and the rear cross member 170 is centered around pivot axis PA2 in the direction as indicated by arrow 206. The fixed gear assembly 204 further includes a mounting portion 204A which is coupled to a fastener 204B configured to be received through pivot aperture 79 of the first support bracket 70 as best shown in FIGS. 3 and 7B. It is further contemplated that the fixed gear assembly could be fixedly mounted on the second support bracket 72 with actuator 200 disposed near the second support bracket 72 in an alternative configuration.

Referring now to FIG. 7B, the first retainer bracket 94, the first support bracket 70 and the first guide bracket 50 are all shown in phantom, with other components coupled thereto also shown in phantom, to reveal the geared interconnection between the drive gear 202 of actuator 200 and the fixed gear assembly 204 at the first position 203. As noted above, when the drive gear 202 rotates in a counter clockwise direction to rotate the seat frame 40 upward to the upright non-use position, the drive gear 202 will make its way from the first position 203 to the second position 205 along the fixed gear assembly 204. Thus, in FIG. 4C, it is contemplated that the drive gear 202 is in the second position 205 having raised the seat frame 40 to the upright non-use position. When the seat frame 40 is to be returned to the deployed position, it is contemplated that drive gear 202 will rotate in a clockwise direction to move from the second position 205 towards the first position 203 along the fixed gear assembly 204. Thus, the geared engagement between the drive gear 202 and the fixed gear 204 provides for the pivoting movement of the seat portion 20, and the seat frame 40 thereof, between the use and upright non-use positions.

Figure 8:
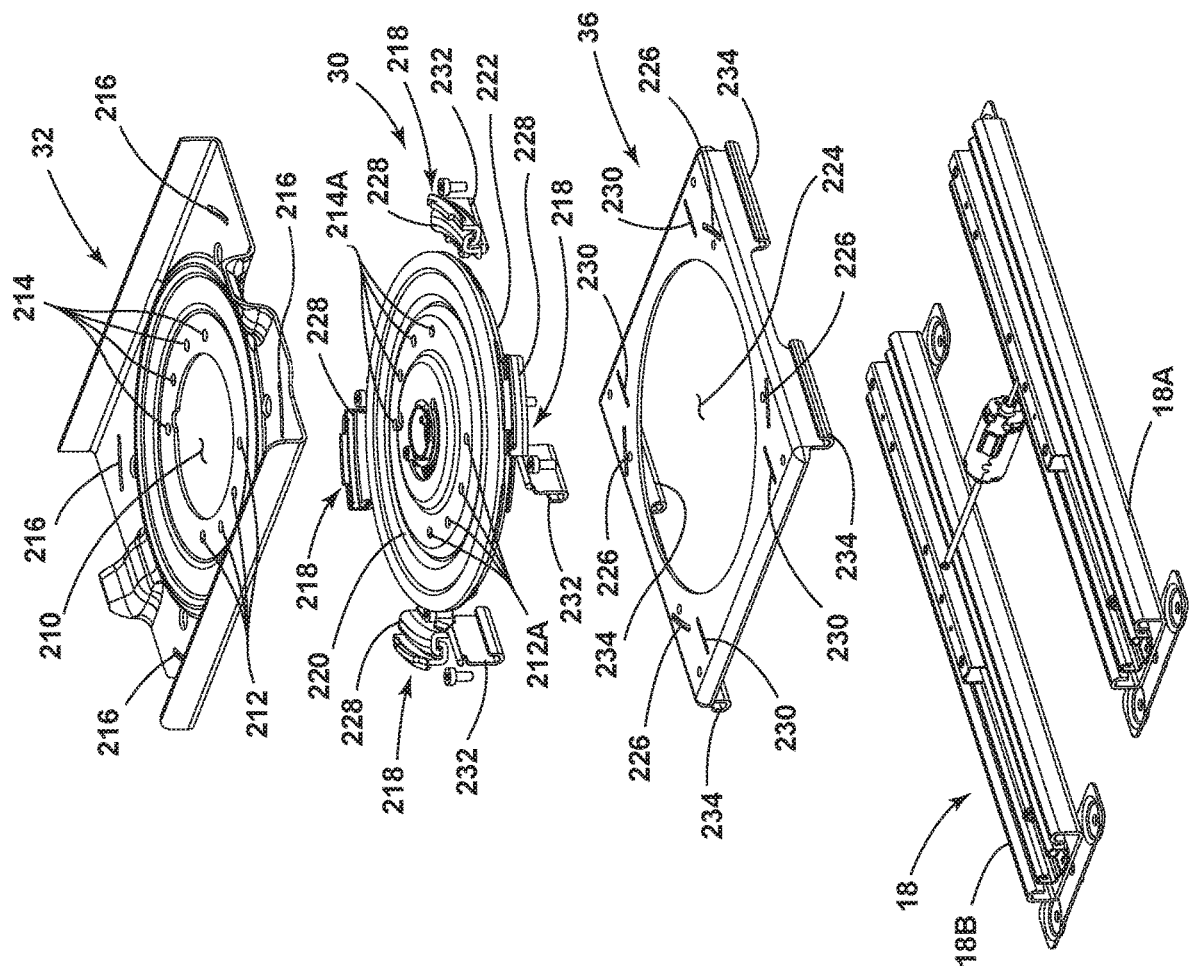
FIG. 8 is an exploded top perspective view of a swivel mechanism and track assembly.

Referring now to FIG. 8, an exploded view of the lower components of the seat assembly 10 is shown. Specifically, the exploded view of FIG. 8 includes a base frame 32, a swivel mechanism 30 and a track assembly 18 having first and second tracks 18A, 18B. As shown in FIG. 8, the base frame 32 includes a configuration similar to the base frame 32 described in FIGS. 2A-4C with the first and second sides 130, 132 (FIGS. 4B and 4C) removed therefrom. In the description of the interconnection between the base frame 32 and the swivel mechanism 30, it is contemplated that the base frame 32 shown in FIG. 8 exemplifies the base frame 32 as described throughout the present specification in all forms. The base frame 32 includes a centrally disposed aperture 210 having mounting apertures 212, 214 disposed therearound. The mounting apertures 212, 214 are configured to fixedly couple the base frame 32 to an upper portion 220 of the swivel mechanism 30 at mounting apertures 212A, 214A of the upper portion 220 of the swivel mechanism 30. The base frame 32 further includes a plurality of slots 216 disposed therearound for receiving hook members 218. The hook members 218 are configured to operably couple to engagement member 228 which are operably coupled to slots 226 of the mounting plate 36. Much like the base frame 32, the mounting plate 36 includes a plurality of slots 226 for coupling to the engagement members 228. The engagement members 228 are contemplated to be fixedly mounted to the mounting plate 36 at the slots 226. The hook members 218 are contemplated to be fixedly mounted the slots 216 of the base frame 32 for rotation of the base frame 32 as coupled to the upper portion 220 of the swivel mechanism 30. The swivel mechanism 30 further includes a base portion 222 which is mounted to the mounting plate 36 at a centrally disposed aperture 224 in which the swivel mechanism is received. As shown in FIG. 8, the mounting plate 36 further includes slots 230 for fixedly coupling to engagement members 232. The engagement members 232 are used in conjunction with hooked-shaped members 234 disposed on the mounting plate 36 to slidingly couple to the mounting plate 36 to the track assembly 18 for fore and aft movement thereon.

Thus, as noted above, the lift mechanisms 34, 34A of the present concept are configured to be fixedly mounted to the base frame 32 for vertical movement thereon. As such, the seat assembly 10 can move between vertical positions using the lift mechanisms 34, 34A. Further, the seat assemblies 10 can rotate or swivel between forward-facing and rearward-facing configurations, as the base frame 32 is rotatably mounted to the swivel mechanism 30. Specifically, the upper portion 220 of the swivel mechanism 30 is rotatably supported on the base portion 222 of the swivel mechanism 30. It is contemplated that the upper portion 220 and the base portion 222 of the swivel mechanism 30 are engaged by a ball bearing connection or other like connection to provide consistent swivel movement between forward-facing and rearward-facing configurations. As the base frame 32 rotates, the hook members 218 rotate therewith to engage the adjacent engagement members 228 as mounted to the mounting plate 36. Thus, the engagement between the hook members 218 and the engagement members 228 is not a fixed engagement, but a selective engagement based on the rotation of the seat assembly 10 and the base frame 32 thereof.

Figure 9:
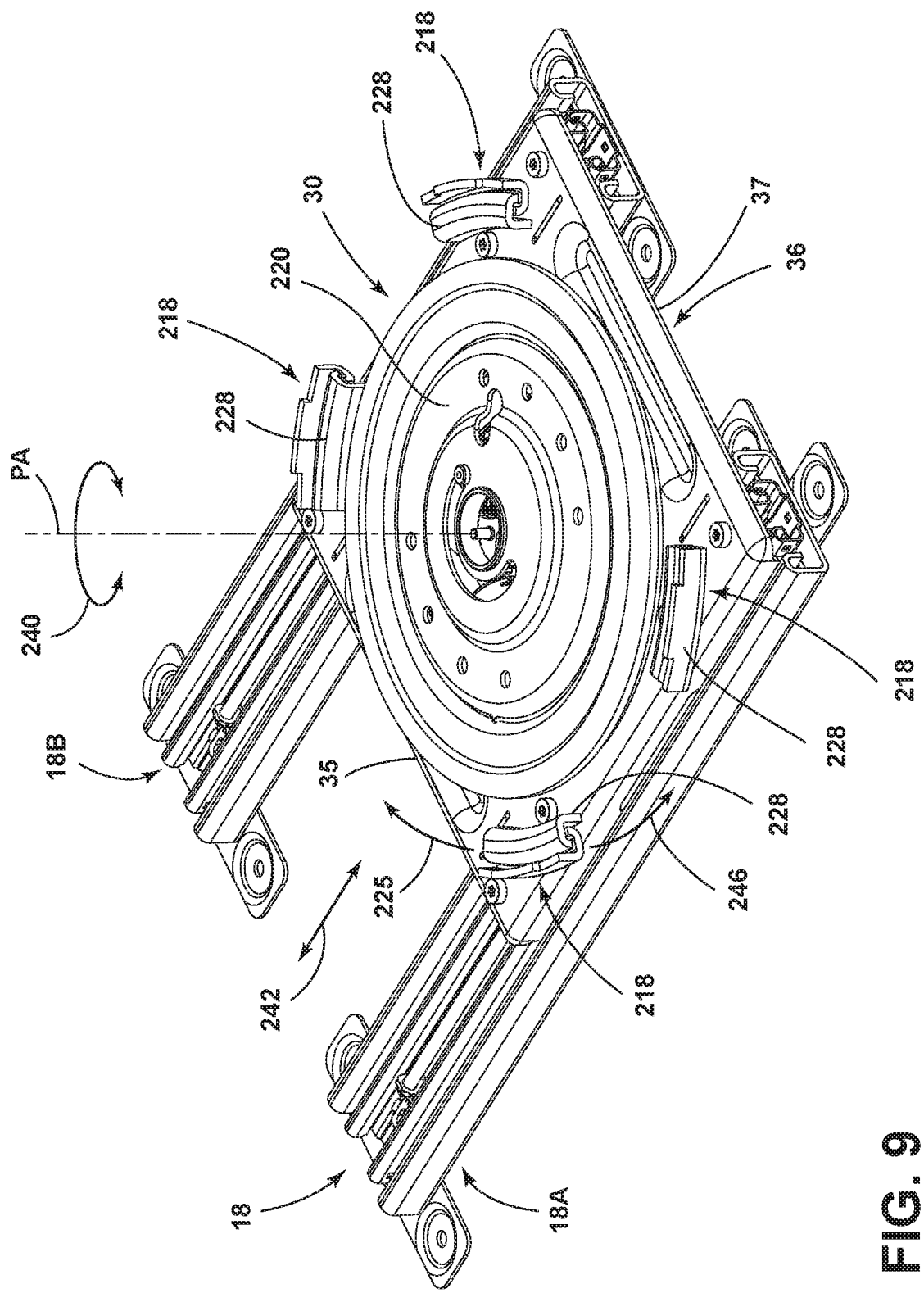
FIG. 9 is a top perspective view of the swivel mechanism of FIG. 8 shown in an assembled condition.

Referring now to FIG. 9, the swivel mechanism 30 is shown mounted on the mounting plate 36 wherein the upper portion 220 thereof is configured for rotation along a pivot axis PA as shown by arrow 240. As noted above, the pivot axis PA is a centralized pivot axis defined by the swivel mechanism 30 for rotation of the seat assembly 10 described above. In FIG. 9, the mounting plate 36 is shown as being slidably mounted on the track assembly 18 for fore and aft movement along the track assembly 18 in the direction as indicated by arrow 242. The hook members 218 and engagement members 228 are shown in an engaged condition, and are configured to engage one another to ensure that the seat assembly 10 is stable in both the forward-facing and rearward-facing configurations. In FIG. 9, the base frame 32 of FIG. 8 has been removed to reveal the engagement between the hook members 218 and the engagement members 228. As noted above however, the hook members 218 are contemplated to be mounted to the slots 216 of the base frame 32 for rotation therewith. As specifically shown in FIG. 9, hook member 218 shown supported along a front portion 35 of the mounting plate 36 can be rotated in the directions 225, 246 with the base frame 32 when the seat assembly 10 rotates between rearward and forward-facing configurations. Thus, if the base frame 32 is mounted on the swivel mechanism 30, the base frame 32 can rotate in the direction 225 to move the seat assembly 10 from a forward-facing configuration to a rearward-facing configuration. As the base frame 32 rotates along the path as indicated by arrow 225, the hook member 218 disposed near the front portion 35 of the mounting plate 36 in FIG. 9 will rotate towards the engagement member 228 disposed over second track 18B near the front portion 35 of the mounting plate 36. Ultimately, the hook member 218 will settle into a position where it is engaged with the engagement member 228 disposed over second track 18B near the rear portion 37 of the mounting plate 36 after a 180° seat rotation. Once engaged therewith, it is assumed that the seat assembly 10 is now in a rearward-facing configuration. As such, the hook members 218 are configured for selective engagement between adjacent engagement members 228 of the mounting plate 36.

Figure 10:
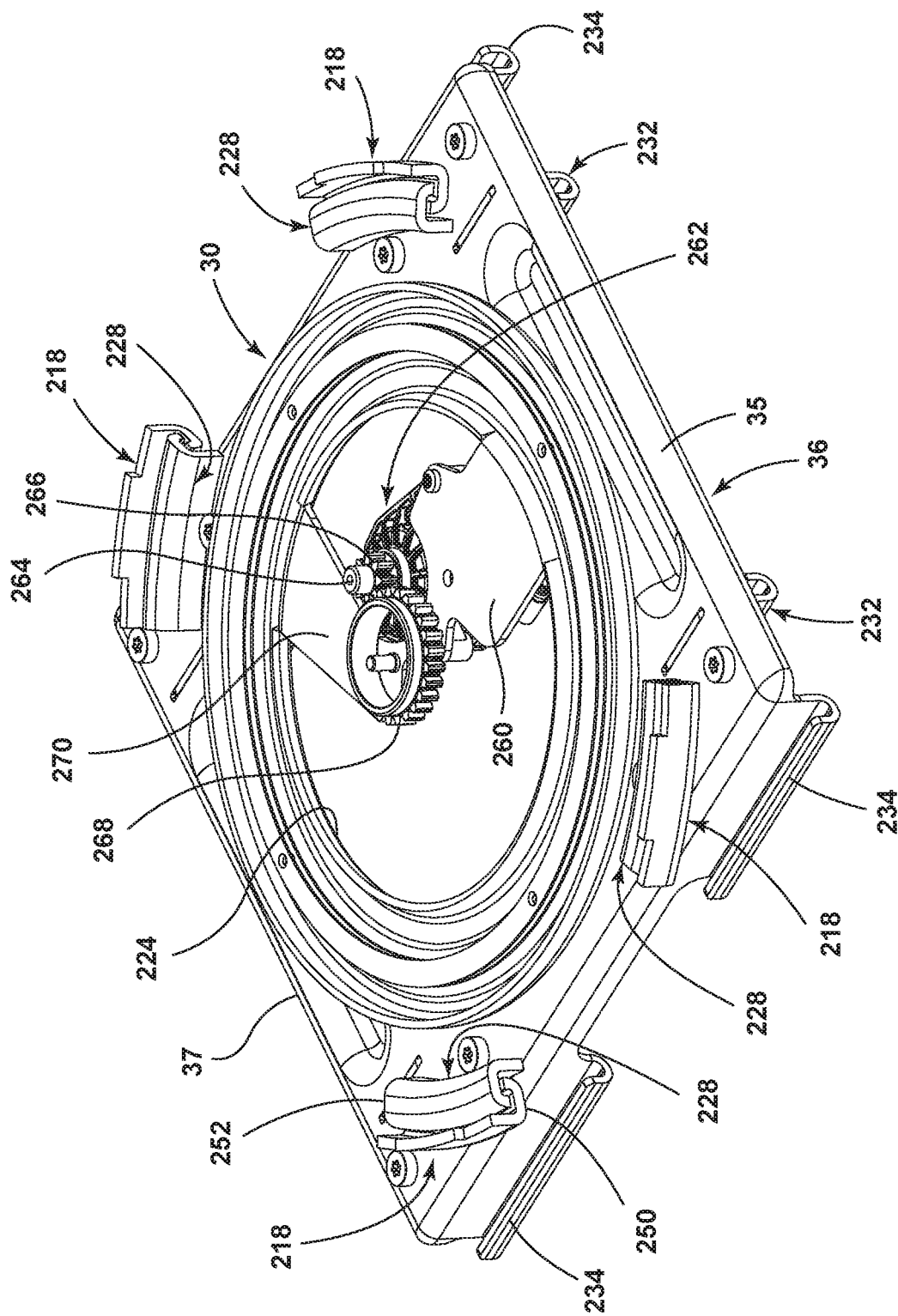
FIG. 10 is a top perspective view of the swivel mechanism of FIG. 9 with an upper portion of the swivel mechanism removed.

Referring now to FIG. 10, multiple hook members 218 are shown engaged with engagement member 228. The hook members 218 are configured to downwardly extend from the base frame 32, as described above. The hook members 218 include upwardly turned end portions 250 to provide an overall J-shaped configuration. Similarly, the engagement member 228 of the mounting plate 36 upwardly extend from the mounting plate 36 and include downwardly opening channels 252. In use, the upwardly turned end portions 250 of the hook members 218 are configured to be received in the downwardly opening channels 252 of engagement members 228 in a selective manner as the base frame 32 rotates with the hook members 218. As such, the upwardly turned end portions 250 of the hook members 218 are contemplated to be slidably received within the downwardly opening channels 252 of the engagement member 228 to allow for rotation of the base frame 32 relative to the mounting plate 36. As further shown in FIG. 10, the hook members 218 and the engagement member 228 are curved to provide the necessary rotation of the mounting plate 36 without interference between the engagement of the hook members 218 and engagement member 228.

As further shown in FIG. 10, the upper portion 220 of the swivel mechanism 30 has been removed to reveal a mounting bracket 260 having an actuator 262 mounted thereon. The actuator 262 includes a drive shaft 264 rotatably supporting a spur gear 266 thereon. The spur gear 266 is gearingly engaged with a sector portion 268 of a bracket 270 which is contemplated to be engaged with the upper portion 220 of the swivel mechanism 30. In this way, the rotation of the spur gear 266 of the actuator 262 can drive rotation of the upper portion 220 of the swivel mechanism 30 by the engagement of the spur gear 266 with the bracket 270 and the sector portion 268 thereof. In this way, the actuator 262 is operably coupled between the base portion 222 and the upper portion 220 of the swivel mechanism 30 for rotating the seat portion 20 within the confines of the second rotational footprint RF2 described above. As shown in FIGS. 2A-2C and 5A-5C, the base frame 32 is configured to be operably coupled to the upper portion 220 of the swivel mechanism 30 for rotation along the centrally disposed pivot axis PA thereof. Thus, the swivel mechanism 30 is operably coupled to the base frame 32 for moving the seat assembly 10 between forward-facing and rearward-facing configurations.

As used throughout this disclosure, the term "actuator" is meant to describe a component of a system that is responsible for moving and controlling parts of the system. For example, by lifting the seat assembly, swiveling the seat assembly between forward-facing and rearward-facing configurations, or pivoting the seat portion between the stowed and deployed positions, an actuator is used to make these adjustments powered adjustments performed in unoccupied seat assemblies. In simple terms, the actuators described herein are "movers" that generally require a control signal and a source of energy, such as the power source of the vehicle.

According to one aspect of the present invention, a seat assembly includes a base frame with first and second guide brackets coupled to opposed sides of the base frame. The first and second guide brackets each include slots disposed therethrough. First and second support brackets are slideably mounted to the slots of the first and second guide brackets. A seat portion includes a seat frame that is pivotally coupled to the first and second support brackets at opposed first and second ends of the seat frame. The seat frame is configured to pivot with respect to the first and second support brackets between use and upright non-use positions.

Embodiments of the first aspect of the invention can include any one or a combination of the following features:
  first and second actuators coupled to the base frame, wherein the first and second actuators are further coupled to the first and second support brackets, respectively for driving movement of the first and second support brackets between raised and lowered positions;
  a cross member disposed between and interconnecting the opposed first and second ends of the seat frame;
  an actuator disposed within an interior portion of the cross member;
  the actuator includes a drive gear engaged in a geared relationship with a fixed gear assembly mounted to one of the first and second support brackets to drive the seat frame between the use and upright non-use positions;
  a swivel mechanism, wherein the base frame is rotatably supported on a rotating upper portion of the swivel mechanism for rotation about a pivot axis;

the seat frame includes a front edge, and further wherein the front edge of the seat frame is vertically juxtaposed over the swivel mechanism when the seat frame is in the upright non-use position; and the front edge of the seat frame is disposed outwardly in a forward direction beyond the swivel mechanism when the seat frame is in the use position.

According to another aspect of the present invention, a seat assembly includes a base frame. A guide bracket is coupled to the base frame and includes inner and outer surfaces. A support bracket is slideably coupled to the inner surface of the guide bracket between raised and lowered positions. A retainer bracket is slideably coupled to the outer surface of the guide bracket. The retainer bracket is further coupled to the support bracket for movement therewith. A seat frame is pivotally coupled to the support bracket between use and upright non-use positions.

Embodiments of the second aspect of the invention can include any one or a combination of the following features:
- the support bracket includes a forwardly extending base portion having an inwardly extending support tab;
- an underside of the seat frame abuts the support tab of the support bracket when the seat frame is in the use position;
- the seat frame includes a front edge extending outwardly in a forward direction beyond a front edge of the base frame when the seat frame is in the use position;
- the front edge of the base frame is disposed outwardly in a forward direction beyond the front edge of the seat frame when the seat frame is in the upright non-use position;
- a first actuator operably coupled between the base frame and the support bracket for driving the support bracket between the raised and lowered positions; and
- a second actuator operably coupled between the seat frame and the support bracket for driving the seat frame between the use and upright non-use positions.

According to yet another aspect of the present invention, a seat assembly includes a support bracket. A retainer bracket is operably coupled to the support bracket. A guide bracket is slideably disposed between the support bracket and the retainer bracket. The guide bracket includes at least one slot disposed therethrough. At least one guide member is slideably received in the at least one slot of the guide bracket. The at least one guide member is coupled to the support bracket on a first side of the at least one guide member. The at least one guide member is coupled to the retainer bracket on a second side of the at least one guide member. A seat frame is pivotally coupled to the support bracket.

Embodiments of the third aspect of the invention can include any one or a combination of the following features:
- the seat frame pivots between use and upright non-use positions relative to the support bracket;
- a first actuator operably coupled between the seat frame and the support bracket for driving the seat frame between the use and upright non-use positions;
- a second actuator coupled to the support bracket for driving the support bracket and the retainer bracket between raised and lowered positions relative to the guide bracket; and
- the at least one slot includes first and second slots spaced-apart from one another on the guide bracket, and further wherein the at least one guide member includes first and second guide members slideably received in the first and second slots, respectively.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seat assembly, comprising:
   a base frame;
   first and second guide brackets coupled to opposed sides of the base frame, wherein the first and second guide brackets each include one or more slots disposed therethrough;
   first and second support brackets slideably mounted to the one or more slots of the first and second guide brackets, respectively;
   a seat portion having a seat frame that is pivotally coupled to the first and second support brackets at opposed first and second ends of the seat frame, respectively, wherein the seat frame pivots with respect to the first and second support brackets between use and upright non-use positions; and
   a swivel mechanism, wherein the base frame is rotatably supported on a rotating upper portion of the swivel mechanism for rotation about a pivot axis.

2. The seat assembly of claim 1, including:
   first and second actuators coupled to the base frame, wherein the first and second actuators are further coupled to the first and second support brackets, respectively for driving movement of the first and second support brackets between raised and lowered positions.

3. The seat assembly of claim 1, including:
   a cross member disposed between and interconnecting the opposed first and second ends of the seat frame.

4. The seat assembly of claim 3, including:
   an actuator disposed within an interior portion of the cross member.

5. The seat assembly of claim 4, wherein the actuator includes a drive gear engaged in a geared relationship with a fixed gear assembly mounted to one of the first and second support brackets to drive the seat frame between the use and upright non-use positions.

6. The seat assembly of claim 1, wherein the seat frame includes a front edge, and further wherein the front edge of the seat frame is vertically juxtaposed over the swivel mechanism when the seat frame is in the upright non-use position.

7. The seat assembly of claim 6, wherein the front edge of the seat frame is disposed outwardly in a forward direction beyond the swivel mechanism when the seat frame is in the use position.

8. A seat assembly, comprising:
   a base frame;
   a guide bracket coupled to the base frame and having inner and outer surfaces;
   a support bracket slideably coupled to the inner surface of the guide bracket between raised and lowered positions;
   a first actuator operably coupled between the base frame and the support bracket for driving the support bracket between the raised and lowered positions;
   a retainer bracket slideably coupled to the outer surface of the guide bracket, wherein the retainer bracket is further coupled to the support bracket for movement therewith; and a seat frame pivotally coupled to the support bracket between use and upright non-use positions.

9. The seat assembly of claim 8, including:
a second actuator operably coupled between the seat frame and the support bracket for driving the seat frame between the use and upright non-use positions.

10. The seat assembly of claim 8, wherein the support bracket includes a forwardly extending base portion having an inwardly extending support tab.

11. The seat assembly of claim 10, wherein an underside of the seat frame abuts the support tab of the support bracket when the seat frame is in the use position.

12. The seat assembly of claim 8, wherein the seat frame includes a front edge extending outwardly in a forward direction beyond a front edge of the base frame when the seat frame is in the use position.

13. The seat assembly of claim 12, wherein the front edge of the base frame is disposed outwardly in a forward direction beyond the front edge of the seat frame when the seat frame is in the upright non-use position.

14. A seat assembly, comprising:
a support bracket;
a retainer bracket operably coupled to the support bracket;
a guide bracket slideably disposed between the support bracket and the retainer bracket, wherein the guide bracket includes at least one slot disposed therethrough;
at least one guide member slideably received in the at least one slot of the guide bracket, wherein the at least one guide member is coupled to the support bracket on a first side of the at least one guide member, and further wherein the at least one guide member is coupled to the retainer bracket on a second side of the at least one guide member;
a seat frame pivotally coupled to the support bracket between use and upright non-use positions relative to the support bracket; and
a first actuator operably coupled between the seat frame and the support bracket for driving the seat frame between the use and upright non-use position.

15. The seat assembly of claim 14, including:
a second actuator coupled to the support bracket for driving the support bracket and the retainer bracket between raised and lowered positions relative to the guide bracket.

16. The seat assembly of claim 14, wherein the at least one slot includes first and second slots spaced-apart from one another on the guide bracket, and further wherein the at least one guide member includes first and second guide members slideably received in the first and second slots, respectively.

\* \* \* \* \*